United States Patent
Tong et al.

(10) Patent No.: US 11,316,804 B2
(45) Date of Patent: Apr. 26, 2022

(54) FORWARDING ENTRY UPDATE METHOD AND APPARATUS IN A MEMORY

(71) Applicant: Huawei Technologies Co., Ltd., Shenzhen (CN)

(72) Inventors: Xing Tong, Beijing (CN); Hongliang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 0 days.

(21) Appl. No.: 16/919,465

(22) Filed: Jul. 2, 2020

(65) Prior Publication Data

US 2020/0366626 A1    Nov. 19, 2020

Related U.S. Application Data

(63) Continuation of application No. PCT/CN2019/110054, filed on Oct. 9, 2019.

(30) Foreign Application Priority Data

Oct. 9, 2018  (CN) .......................... 201811172338.X

(51) Int. Cl.
| | |
|---|---|
| *H04L 12/66* | (2006.01) |
| *H04L 49/90* | (2022.01) |
| *H04L 45/02* | (2022.01) |
| *H04L 45/745* | (2022.01) |

(52) U.S. Cl.
CPC ........ *H04L 49/9078* (2013.01); *H04L 45/026* (2013.01); *H04L 45/7457* (2013.01)

(58) Field of Classification Search
CPC ............... H04L 49/9078; H04L 45/026; H04L 45/7457; H04L 45/02; H04L 12/74
See application file for complete search history.

(56) References Cited

U.S. PATENT DOCUMENTS

| | | | | |
|---|---|---|---|---|
| 5,938,736 | A | * | 8/1999 | Muller ................ H04L 45/7453 709/243 |
| 2008/0095134 | A1 | | 4/2008 | Chen et al. |
| 2009/0259747 | A1 | | 10/2009 | Sagefalk et al. |
| 2013/0329603 | A1 | * | 12/2013 | Ghosh ..................... H04L 45/02 370/254 |

(Continued)

FOREIGN PATENT DOCUMENTS

| | | |
|---|---|---|
| CN | 101068170 A | 11/2007 |
| CN | 101330466 A | 12/2008 |

(Continued)

OTHER PUBLICATIONS

Shi, H.T. et al., "Heuristic Update Algorithm of Routing Table Based on Traffic Prediction," Science Technology and Engineering, vol. 13, No. 24, Aug. 2013, 8 pages.

*Primary Examiner* — Abdelnabi O Musa
(74) *Attorney, Agent, or Firm* — Slater Matsil, LLP

(57) ABSTRACT

A forwarding entry update method and apparatus, the method including receiving a write operation packet, where the write operation packet has write operation information, where the write operation information has write operation data and a write operation address, where the write operation data indicates a forwarding entry, and where the write operation address indicates an address to which the write operation data is to be written in a memory, obtaining the write operation information from the write operation packet, and writing the write operation data into the memory according to the write operation address in the write operation information.

18 Claims, 9 Drawing Sheets

(56) References Cited

U.S. PATENT DOCUMENTS

| | | | |
|---|---|---|---|
| 2015/0026681 A1* | 1/2015 | Lin | G06F 9/45533 |
| | | | 718/1 |
| 2015/0178221 A1* | 6/2015 | Damodaran | G06F 7/483 |
| | | | 711/3 |
| 2015/0293712 A1 | 10/2015 | Li et al. | |
| 2016/0087893 A1 | 3/2016 | Nedunchezhian et al. | |
| 2017/0139644 A1* | 5/2017 | White | G06F 9/5016 |
| 2017/0364707 A1* | 12/2017 | Lal | G06F 21/57 |

FOREIGN PATENT DOCUMENTS

| | | |
|---|---|---|
| CN | 101631086 A | 1/2010 |
| CN | 101778113 A | 7/2010 |
| CN | 101783715 A | 7/2010 |
| CN | 102186221 A | 9/2011 |
| CN | 102281146 A | 12/2011 |
| CN | 102739549 A | 10/2012 |
| CN | 102857414 A | 1/2013 |
| CN | 102929818 A | 2/2013 |
| CN | 103984506 A | 8/2014 |
| CN | 104320349 A | 1/2015 |
| CN | 104394099 A | 3/2015 |
| CN | 105099948 A | 11/2015 |
| CN | 105591936 A | 5/2016 |
| CN | 106330579 A | 1/2017 |
| CN | 106656803 A | 5/2017 |
| CN | 106713132 A | 5/2017 |
| CN | 107547364 A | 1/2018 |
| CN | 107579916 A | 1/2018 |
| CN | 107769988 A | 3/2018 |
| CN | 108418740 A | 8/2018 |
| CN | 111555981 A | 8/2020 |

\* cited by examiner

| MAC | IP | UDP | SN | W_Num | Write operation information 1 | Write operation information 2 | ... | Write operation information n |
FIG. 4
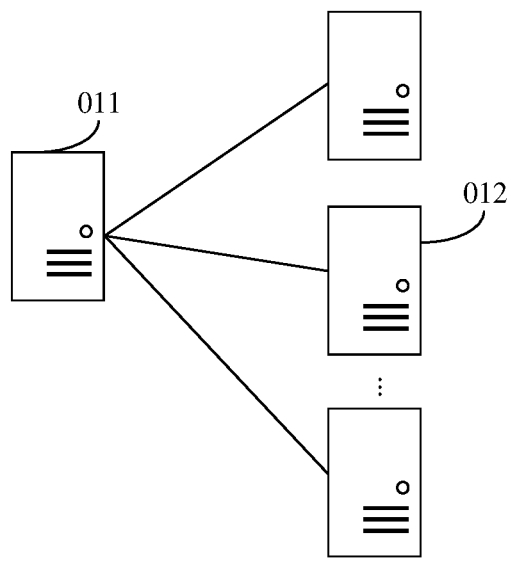
FIG. 5
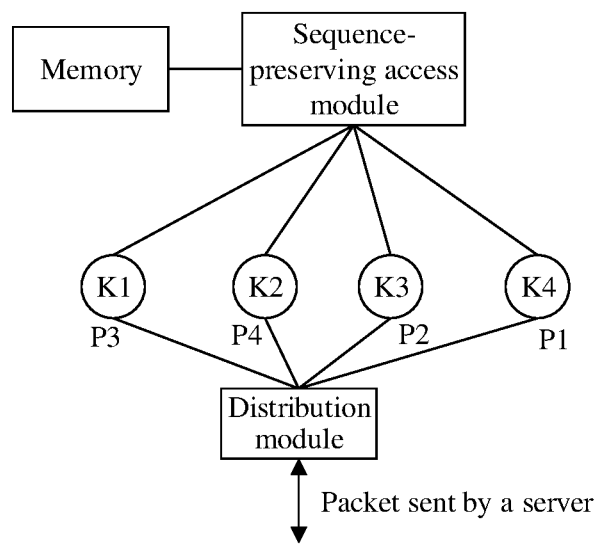
FIG. 6

FORWARDING ENTRY UPDATE METHOD AND APPARATUS IN A MEMORY

CROSS-REFERENCE TO RELATED APPLICATIONS

This application is a continuation of International Application No. PCT/CN2019/110054, filed on Oct. 9, 2019, which claims priority to Chinese Patent Application No. 201811172338.X, filed on Oct. 9, 2018. The disclosures of the aforementioned applications are hereby incorporated by reference in their entireties.

TECHNICAL FIELD

This application relates to the communications field, and in particular, to a forwarding entry update method and apparatus.

BACKGROUND

To improve a data throughput of a router, currently, routers are usually deployed in a distributed manner. The routers deployed in a distributed manner may also be referred to as a routing system. The routing system may include a server, a line card box connected to the server, and a switching box connected to the line card box. The server is a main control device of the routing system and runs various network protocols. A network processor is deployed in the line card box and is configured to implement hard forwarding functions such as packet processing, protocol analysis, and route lookup. The switching box is configured to implement switching of a data packet.

In a related technology, the server may establish a communication connection to the line card box and may send, to the line card box, instruction information used to instruct to add or delete a forwarding entry. After receiving the instruction information through a service interface, the network processor of the line card box may forward the instruction information to a processor. The processor may process the instruction information according to a routing algorithm to generate write operation data, and may send the write operation data to the network processor. Then the network processor may write the write operation data into a memory, to update the forwarding entry.

However, processing performance of the processor of the line card box is limited. Consequently, a rate at which the server delivers instruction information is restricted, resulting in relatively low efficiency in updating a forwarding entry.

SUMMARY

This application provides a forwarding entry update method and apparatus, to resolve a problem of relatively low efficiency in updating a forwarding entry in a related art. The technical solutions are as follows.

According to a first aspect, a forwarding entry update method is provided. The method may be applied to a packet receive end. The method may include receiving a write operation packet, where the write operation packet includes write operation information, the write operation information includes write operation data and a write operation address, the write operation data is used to indicate a to-be-updated forwarding entry, and the write operation address is used to indicate an address to which the write operation data is to be written in a memory, obtaining the write operation information from the write operation packet, and writing the write operation data into the memory based on the write operation address in the write operation information.

In the forwarding entry update method provided in this application, the packet receive end may directly write the write operation data into the memory based on the write operation address in the write operation packet. The packet receive end needs to perform only a memory write operation, without a need to calculate the write operation data. Therefore, a rate at which a packet transmit end delivers a write operation packet is not restricted by processing performance of the packet receive end, thereby effectively improving a rate of delivering a forwarding entry and efficiency in updating the forwarding entry.

Optionally, after the packet receive end writes the write operation data into the memory, the method may further include receiving a first control packet, where the first control packet includes a count value, and detecting whether a total quantity of memory write operations performed after a second control packet is received is equal to the count value, where the memory write operation is an operation of writing write operation data into the memory, the count value is a total count of write operation information included in a write operation packet sent, by the packet transmit end, between the second control packet and the first control packet, and the second control packet is a previous control packet sent before the first control packet, and when the count value is not equal to the total quantity, sending, by the packet receive end, first prompt information, where the first prompt information is used to indicate that a write operation packet sent, by the packet transmit end, after the second control packet is lost, and then receiving, by the packet receive end, the write operation packet re-sent by the packet transmit end based on the first prompt information.

The packet receive end detects, based on the count value in the first control packet, whether a write operation packet is lost. When detecting that a write operation packet is lost, the packet receive end may indicate, by using the first prompt information, the packet transmit end to re-send the write operation packet. This can ensure that the forwarding entry is correctly updated, thereby improving reliability in updating the forwarding entry.

Optionally, each control packet further includes a sequence number, and sequence numbers of the control packets sent by the packet transmit end increase in ascending order. After the packet receive end receives the first control packet, the method may further include detecting whether a difference between a sequence number of the first control packet and a sequence number of a third control packet is a preset difference, where the third control packet is a previous control packet received before the first control packet, and correspondingly, a process of detecting, by the packet receive end, whether a total quantity of memory write operations performed after a second control packet is received is equal to the count value may include when the difference between the sequence number of the first control packet and the sequence number of the third control packet is the preset difference, determining the third control packet as the second control packet, and detecting whether a total quantity of memory write operations performed after the third control packet is received is equal to the count value.

A control packet may be lost in a transmission process. Therefore, before detecting the count value, the packet receive end may first detect, by using the sequence number of the first control packet, whether a control packet is lost, and when detecting that no control packet is lost, proceed to detect the count value. This can ensure accuracy and reliability in detecting the count value.

Optionally, when detecting that the difference between the sequence number of the first control packet and the sequence number of the third control packet is not the preset difference, the packet receive end may further send second prompt information, where the second prompt information is used to indicate that a control packet sent after the third control packet is lost. Then, the packet receive end may receive a write operation packet re-sent based on the second prompt information.

When the packet receive end detects, based on the sequence number of the first control packet, that a control packet is lost, to ensure that a quantity of executed memory write operation can be effectively detected, the second prompt information may be used to indicate the packet transmit end to re-send the write operation packet. This can ensure that the forwarding entry is correctly updated, thereby improving reliability in updating the forwarding entry.

Optionally, the method may further include receiving a keepalive packet, where the keepalive packet includes a sequence number, a difference between the sequence number of the keepalive packet sent by the packet transmit end and a sequence number of a previous control packet sent before the keepalive packet is the preset difference, detecting whether a difference between the sequence number of the keepalive packet and a sequence number of a fourth control packet is the preset difference, where the fourth control packet is a previous control packet received before the keepalive packet, when the difference between the sequence number of the keepalive packet and the sequence number of the fourth control packet is not the preset difference, sending, by the packet receive end, third prompt information, where the third prompt information is used to indicate that a control packet sent after the fourth control packet is lost, and then receiving, by the packet receive end, a write operation packet re-sent based on the third prompt information.

When sending no write operation packet in a long time, the packet transmit end may send the keepalive packet. The packet receive end may further determine, by using the keepalive packet, whether a control packet is lost, and when detecting that a control packet is lost, instruct, in a timely manner by using the third prompt information, the packet transmit end to re-send the write operation packet, thereby ensuring that the forwarding entry is correctly updated.

Optionally, the write operation packet may further include a sequence number, and a sequence number of a write operation packet sent, by the packet transmit end, between two control packets is equal to a sequence number of a control packet sent later, and after writing the write operation data into the memory, the packet receive end may further collect statistics on a total quantity of memory write operations performed based on write operation packets of a same sequence number, to obtain a correspondence between the sequence number and the total quantity, and correspondingly, a process of detecting, by the packet receive end, whether a total quantity of memory write operations performed after a second control packet is received is equal to the count value may include obtaining a total quantity corresponding to a sequence number of the first control packet, and detecting whether the total quantity corresponding to the sequence number of the first control packet is equal to the count value.

The packet receive end collects statistics on a total quantity of memory write operations by using a sequence number of a write operation packet as an index. In this way, when a control packet is received, a corresponding total quantity may be directly obtained by using a sequence number of the control packet. This effectively improves efficiency in detecting and verifying the total quantity, thereby improving efficiency in updating the forwarding entry.

Optionally, when writing the write operation data into the memory based on the write operation address in the write operation information, the packet receive end may write the write operation data into the memory in sequence based on the write operation address in each piece of write operation information according to a receiving sequence of the write operation packet and a sequence of the write operation information included in the write operation packet.

The packet receive end performs memory write operations in sequence according to the receiving sequence of the write operation packet and the sequence of the write operation information included in the write operation packet. This can ensure that the forwarding entry is correctly updated.

According to a second aspect, a forwarding entry update method is provided. The method may be applied to a packet transmit end. The method may include generating write operation information based on a to-be-updated forwarding entry, where the write operation information includes write operation data and a write operation address, the write operation data is used to indicate the to-be-updated forwarding entry, and the write operation address is used to indicate an address to which the write operation data is to be written, encapsulating the generated write operation information into a write operation packet, and sending the write operation packet, where the write operation packet is used to indicate to write the write operation data into a memory based on the write operation address in the write operation information.

In the method provided in this application, a packet receive end may directly perform a memory write operation based on the write operation information in the write operation packet, without a need to calculate the write operation data, thereby effectively improving a rate of delivering a forwarding entry and efficiency in updating the forwarding entry.

Optionally, the method may further include sending a first control packet, where the first control packet includes a count value, the count value is a total count of write operation information included in a write operation packet sent after a second control packet is sent, and the second control packet is a previous control packet sent before the first control packet, and when receiving first prompt information that is used to indicate that a write operation packet sent after the second control packet is lost, re-sending the write operation packet sent after the second control packet, where the first prompt information is sent when the packet receive end detects that a total quantity of memory write operations performed after the second control packet is received is not equal to the count value.

The packet transmit end sends the first control packet, so that the packet receive end can detect, based on the count value in the first control packet, whether a write operation packet is lost. When it is detected that a write operation packet is lost, the first prompt information may be used to indicate the packet transmit end to re-send the write operation packet. This can ensure that the forwarding entry is correctly updated, thereby improving reliability in updating the forwarding entry.

Optionally, each control packet further includes a sequence number, and sequence numbers of the control packets sent by the packet transmit end increase in ascending order. The method may further include when receiving second prompt information that is used to indicate that a control packet sent after a third control packet is lost, re-sending a write operation packet sent after the third control packet, where the second prompt information is sent when the packet receive end detects that a difference between a sequence number of the first control packet and a sequence number of the third control packet is not a preset difference, and the third control packet is a previous control packet received by the packet receive end before the first control packet.

When receiving the second prompt information that is used to indicate that the control packet is lost, the packet transmit end may re-send the write operation packet. This can ensure that the forwarding entry is correctly updated, thereby improving reliability in updating the forwarding entry.

Optionally, each time after a control packet is sent, the method may further include detecting whether idle duration during which no write operation packet is sent after the control packet is sent is greater than a duration threshold, when the idle duration is greater than the duration threshold, sending a keepalive packet, where the keepalive packet includes a sequence number, and a difference between the sequence number of the keepalive packet and a sequence number of a previous control packet is the preset difference, and when receiving third prompt information that is used to indicate that a control packet sent after a fourth control packet is lost, re-sending a write operation packet sent after the fourth control packet, where the third prompt information is sent when the packet receive end detects that a difference between the sequence number of the received keepalive packet and a sequence number of the fourth control packet is not the preset difference, and the fourth control packet is a previous control packet received by the packet receive end before the keepalive packet.

When receiving the third prompt information that is used to indicate that the control packet is lost, the packet transmit end may re-send the write operation packet. This can ensure that the forwarding entry is correctly updated, thereby improving reliability in updating the forwarding entry.

According to a third aspect, a forwarding entry update apparatus is provided. The apparatus may be applied to a packet receive end. The apparatus may include at least one module, and the at least one module may be configured to implement the forwarding entry update method provided in the first aspect.

According to a fourth aspect, a forwarding entry update apparatus is provided. The apparatus may be applied to a packet transmit end. The apparatus may include at least one module, and the at least one module may be configured to implement the forwarding entry update method provided in the second aspect.

According to a fifth aspect, a forwarding entry update apparatus is provided. The apparatus may include a memory, a processor, and a computer program, where the computer program is stored in the memory and can run on the processor, and when the processor executes the computer program, the forwarding entry update method provided in the first aspect or the forwarding entry update method provided in the second aspect is implemented.

According to a sixth aspect, a computer-readable storage medium is provided. The computer-readable storage medium stores an instruction, and when the instruction stored in the computer-readable storage medium is run on a computer, the computer is enabled to perform the forwarding entry update method provided in the first aspect or the forwarding entry update method provided in the second aspect.

According to a seventh aspect, a computer program product including an instruction is provided. When the instruction is run on a computer, the computer is enabled to perform the forwarding entry update method provided in the first aspect or the forwarding entry update method provided in the second aspect.

According to an eighth aspect, a forwarding entry sending system is provided. The system may include a packet transmit end and a packet receive end, where the packet transmit end may include the apparatus provided in the fourth aspect, and the packet receive end may include the apparatus provided in the third aspect.

The technical solutions provided in this application have at least the following beneficial effects.

This application provides the forwarding entry update method and apparatus. The write operation information in the write operation packet sent by the packet transmit end includes the write operation data and the write operation address. The packet receive end may directly write the write operation data into the memory based on the write operation address, to update the forwarding entry. The packet receive end needs to perform only a memory write operation, without a need to calculate the write operation data. Therefore, a rate at which the packet transmit end delivers a write operation packet is not restricted by processing performance of the packet receive end, thereby effectively improving a rate of delivering a forwarding entry and efficiency in updating the forwarding entry.

BRIEF DESCRIPTION OF THE DRAWINGS

FIG. 4 is a schematic diagram of a structure of a write operation packet according to an embodiment of the present invention;

FIG. 5 is an architectural diagram of a server according to an embodiment of the present invention;

FIG. 6 is a schematic diagram of a partial structure of a line card box according to an embodiment of the present invention;

DETAILED DESCRIPTION OF ILLUSTRATIVE EMBODIMENTS

With reference to the accompanying drawings, the following describes in detail a forwarding entry update method provided in embodiments of this application.

Figure 1:
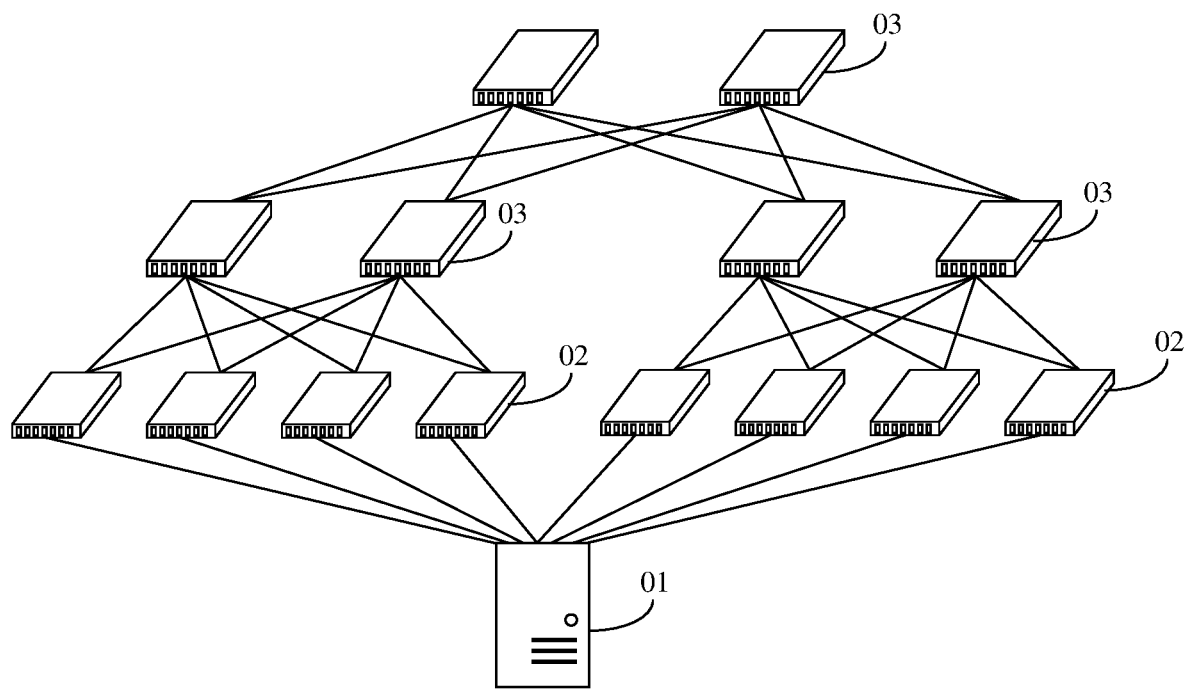
FIG. 1 is a schematic diagram of a structure of a routing system according to an embodiment of the present invention.

FIG. 1 is a schematic diagram of a structure of a routing system according to an embodiment of the present invention. As shown in FIG. 1, the routing system may include a server 01, a plurality of line card boxes 02, and a plurality of switching boxes 03. Each line card box 02 is connected to the server 01, and each line card box 02 may be connected to at least one switching box 03. The plurality of switching boxes 03 may be cascaded. The server 01 may be one server, may be a server cluster including several servers, or may be a cloud computing service center. The server 01 is a main control device of the routing system and runs various network protocols. The server 01 is configured to manage all of the plurality of line card boxes 02, and therefore may also be referred to as a main control server or a control plane server. Each line card box 02 may be deployed with a core processor. The core processor may be a hard forwarding component such as a network processor (NP), an application-specific integrated circuit (ASIC) or a field programmable gate array (FPGA). The core processor is configured to implement forwarding functions such as packet processing, protocol analysis, and route lookup. A hard forwarding component is hardware, in the line card box 02, specially configured to implement a forwarding function. The switching box 03 is configured to implement switching of a data packet. An architecture of the routing system that is deployed in a distributed manner is a scale-out architecture. Quantities of line card boxes 02 and switching boxes 03 can be increased as required by an application scenario. The routing system has a relatively high throughput, and therefore may also be referred to as a petabyte (PB) router.

Figure 2:
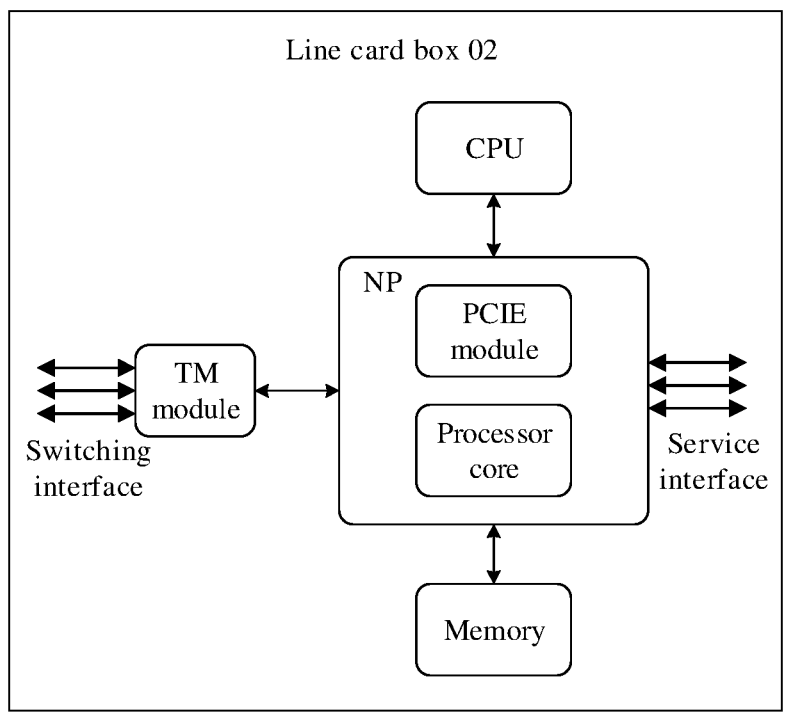
FIG. 2 is a schematic diagram of a structure of a line card box according to an embodiment of the present invention.

FIG. 2 is a schematic diagram of a structure of a line card box according to an embodiment of the present invention. In an example for description, a core processor in the line card box is an NP. As shown in FIG. 2, each line card box 02 may include a central processing unit (CPU), an NP, memory, and a traffic management (TM) module. The NP is separately connected to the CPU, the memory, and the TM module. The NP may further be connected to a server 01 through a service interface, and the TM module may be connected a switching box 03 through a switching interface. The service interface and the switching interface each may be an Ethernet interface. It can be learned from FIG. 2 that the NP may include a processor core and a peripheral component interconnect express (PCI-E) module. The PCIE module may be connected to the CPU through a PCIE bus and connected to the memory through an internal bus. The processor core may be connected to the server 01 through the service interface, and the processor core may further be connected to the CPU through an Ethernet port and connected to the memory through the internal bus.

In a related technology, the processor core of the NP may establish a transmission control protocol (TCP) connection to the server 01 through the service interface. When receiving instruction information that is sent by the server 01 and that is used to instruct to update a forwarding entry, the processor core may forward the instruction information to the CPU. The CPU may process the instruction information according to a format of a routing algorithm table, to generate write operation data, and may send the write operation data to the PCIE module of the NP through the PCIE bus. Then the PCIE module of the NP may write the received write operation data into the memory in series, to update the forwarding entry.

However, considering hardware constraints such as heat dissipation and power consumption of the line card box 02, processing performance of the CPU of the line card box 02 is bottlenecked. In addition, a quantity of CPUs that can be deployed in a single line card box 02 is also limited. Therefore, the processing performance of the CPU in the line card box 02 may restrict a rate at which the server delivers instruction information, thereby restricting efficiency in updating a forwarding entry. Moreover, because the CPU needs to transmit the write operation data through the PCIE bus, bandwidth of the PCIE bus may also restrict efficiency in delivering the write operation data, affecting the efficiency in updating the forwarding entry.

An embodiment of the present invention provides a forwarding entry update method, to resolve a problem of relatively low efficiency in updating a forwarding entry in the related technology. The method may be applied to a scenario in which a packet transmit end needs to update a forwarding entry of a packet receive end. For example, the method may be applied to the routing system shown in FIG. 1. A packet transmit end of the routing system is a server 01, and a packet receive end is a line card box 02. In another scenario, the packet transmit end and the packet receive end may alternatively be network element devices of other types. For example, the packet receive end may alternatively be a switch.

Figure 3:
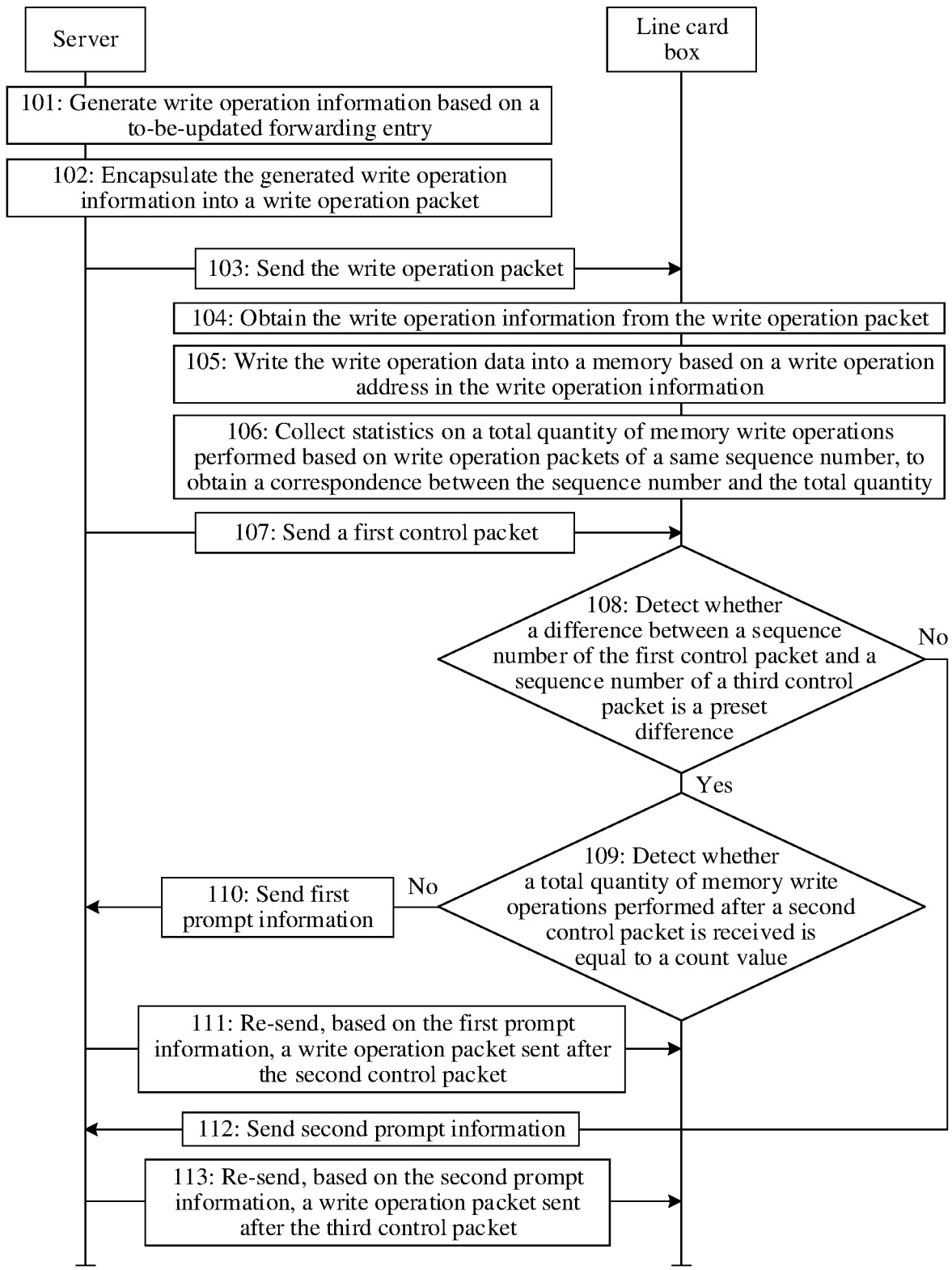
FIG. 3 is a flowchart of a forwarding entry update method according to an embodiment of the present invention.

The following describes the forwarding entry update method in detail by using an example in which the forwarding entry update method is applied to the routing system shown in FIG. 1, specifically, the packet transmit end is a server and the packet receive end is a line card box. Referring to FIG. 3, the method may include the following steps.

Step 101: The server generates write operation information based on a to-be-updated forwarding entry.

In this embodiment of the present invention, the line card box may store a table used to indicate the line card box to forward data traffic, for example, a routing table (routing information base, RIB) and a forwarding table (forwarding information base, FIB). Forwarding entries in the routing table and the forwarding table may be learned of by the server based on a routing protocol and are delivered to the line card box, or may be delivered by the server to the line card box based on a local static configuration. The to-be-updated forwarding entry may be an entry, in the routing table or the forwarding table, that needs to be updated, for example, a route that needs to be added, modified, or deleted.

After obtaining the to-be-updated forwarding entry, the server may generate, based on a format of a routing algorithm table in the line card box, write operation data that indicates the to-be-updated forwarding entry. The write operation data may include data such as a destination address, an output interface, and a next-hop internet protocol (IP) address. In addition, the server may determine, based on a storage address of the to-be-updated forwarding entry in a memory, a write operation address of the write operation data, namely, an address in the memory of the line card box to which the write operation data is to be written. The server may generate one or more pieces of write operation information based on each to-be-updated forwarding entry (namely, each to-be-updated route), where each piece of write operation information may include write operation data and a corresponding write operation address. In write operation information generated by the server based on a to-be-deleted route, write operation address may be a storage address of the to-be-deleted route in the memory of the line card box, and write operation data may be a default value or may be 0.

Step 102: The server encapsulates the generated write operation information into a write operation packet.

The server may encapsulate the write operation information according to a communications protocol between the server and the line card box and according to a packet encapsulation format specified by the communications protocol, to obtain the write operation packet. For example, assuming that the communications protocol established between the server and the line card box is an Ethernet protocol, the server may encapsulate the write operation information according to an Ethernet frame format, to obtain the write operation packet.

Optionally, the server may encapsulate one or more pieces of write operation information generated based on one to-be-updated forwarding entry into one write operation packet, or may encapsulate a plurality of pieces of write operation information generated based on a plurality of to-be-updated forwarding entries into one write operation packet, to improve link utilization. Therefore, each write operation packet obtained through encapsulation by the server may include at least one piece of write operation information, where at least one means one or more.

FIG. 4 is a schematic diagram of a structure of a write operation packet according to an embodiment of the present invention. As shown in FIG. 4, the write operation packet generated by the server may include a MAC header field, an IP header field, a UDP header field, an SN field, a W_Num field, and a data field.

The MAC header field includes information such as a destination media access control (MAC) address and a source MAC address of the write operation packet. The IP header field includes information such as a destination IP address and a source IP address of the write operation packet, where a write operation identifier may further be added to the destination IP address. After receiving the write operation packet, an NP of the line card box may determine, based on the write operation identifier in the destination IP address, that the write operation packet is a packet used to indicate to perform a memory write operation. The UDP header field may include information such as a source port number and a destination port number of the write operation packet, where an identifier used to indicate that a type of the packet is a write operation packet may further be added to the source port number, for example, the identifier may be 0.

The SN field is used to record a sequence number (SN) of the write operation packet. The server may send write operation packets in batches, and each batch may include one or more write operation packets. Sequence numbers of the write operation packets included in each batch are equal, and a difference between a sequence number of a write operation packet in each batch and a sequence number of a write operation packet in a previous batch is a preset difference. In other words, sequence numbers of write operation packet of different batches sent by the server increase in ascending order.

The W_Num field is used to record a quantity of pieces of write operation information included in the write operation packet, namely, a quantity of memory write operations indicated by the write operation packet.

The data field may include at least one piece of write operation information. In other words, the data field may include one or more pieces of write operation information. For example, the write operation packet shown in FIG. 4 includes n pieces of write operation information, where n is an integer greater than 1. Each piece of write operation information may include write operation data and a corresponding write operation address. For example, write operation information 1 may include a write operation address 1 and write operation data 1, and write operation information n may include a write operation address n and write operation data n.

FIG. 5 is an architectural diagram of a server according to an embodiment of the present invention. As shown in FIG. 5, the server may be a server cluster including a master server on and a plurality of computing servers 012. Each computing server 012 may be configured to generate write operation information based on a to-be-updated forwarding entry, and encapsulate the write operation information into a write operation packet. The master server on may be configured to deliver the write operation packet to a line card box 02. The plurality of computing servers 012 may generate write operation packets in parallel, to ensure a rate of generating write operation packets. In addition, a quantity of computing servers 012 in the server cluster may be adjusted flexibly based on an application requirement, to flexibly improve performance of the server cluster in generating write operation packets, eliminating a performance bottleneck. Therefore, rates of generating and delivering write operation packets can be ensured.

Certainly, the server may alternatively be implemented in a manner other than a server cluster, but instead uses a single server that has relatively high performance. An implementation of the server is not limited in this embodiment of the present invention.

Step 103: The server sends the write operation packet to the line card box.

The server may send the write operation packet to the line card box through a communication connection established to the line card box. The line card box may receive the write operation packet sent by the server. For example, the NP of the line card box may receive the write operation packet through a service interface.

Step 104: The line card box obtains the write operation information from the write operation packet.

After receiving the write operation packet, the line card box may decapsulate the write operation packet according to the communications protocol between the line card box and the server and according to the packet encapsulation format specified by the communications protocol, to obtain the write operation information from the write operation packet. When the write operation packet includes the plurality of pieces of write operation information, the line card box may further determine, based on the W_Num field in the write operation packet, the quantity of pieces of write operation information included in the write operation packet. In this way, the line card box may further obtain each piece of write operation information in sequence based on a length (namely, a quantity of occupied bytes) of the write operation information. The length of each piece of write operation information may be a fixed value specified in the packet encapsulation format.

For example, it is assumed that a structure of the write operation packet received by the NP of the line card box is shown in FIG. 4, where a length of each piece of write operation information is k bytes (k is an integer greater than 1). Then, the NP may decapsulate the write operation packet according to the Ethernet frame format. In a decapsulation process, the NP may determine, based on the obtained write operation identifier in the destination IP address of the write operation packet, that the write operation packet is a packet used to indicate to perform a memory write operation. Further, the NP may determine, based on the W_Num field, that the quantity of pieces of write operation information included in the write operation packet is n, then read the data field of the write operation packet, and determine that every k bytes read from the data field are one piece of write operation information, thereby obtaining the write operation information 1 to the write operation information n in sequence.

Step 105: The line card box may write the write operation data into the memory based on the write operation address in the write operation information.

In this embodiment of the present invention, when the write operation packet includes the plurality of pieces of write operation information, the line card box may write, into the memory in sequence based on the write operation address in each piece of write operation information, the write operation data in the write operation information starting from a first piece of write operation information (namely, write operation information closest to each header field) according to a sequence of the plurality of pieces of write operation information in the write operation packet. The server may generate a plurality of pieces of write operation information based on each to-be-updated forwarding entry. Therefore, writing write operation data in sequence according to a sequence of the write operation information can ensure that the forwarding entry is correctly updated. Both sequences and lengths of the write operation address and the write operation data in each piece of write operation information may be preset in the packet encapsulation format. For example, the quantity k of bytes occupied by each piece of write operation information may be k=k1+k2, where first k1 bytes are the write operation address, and previous k2 bytes are the write operation data. Based on the preset sequences and lengths, the line card box may consider, as the write operation address, the first k1 bytes read from the write operation information, and consider, as the write operation data, the previous k2 bytes read from the write operation information.

For example, for the write operation packet shown in FIG. 4, the NP may read the write operation address and the write operation data in each piece of write operation information in sequence starting from the write operation information 1, and write the write operation data in the write operation information to a corresponding address in the memory. Writing the write operation data in each piece of write operation information into the memory is equivalent to performing one memory write operation.

In the method provided in this embodiment of the present invention, the line card box needs to perform only the memory write operation, without a need to calculate the write operation data. Therefore, a rate at which the server delivers the write operation packet is not restricted by performance of line card box, effectively improving a rate of delivering a forwarding entry and efficiency in updating the forwarding entry. Currently, a specification of a routing table in a core router is usually 10 million (M). Specifically, the routing table includes 107 routes. In a related technology, a route delivery rate is usually 50 thousand (K) routes per second, namely, 50,000 routes per second. It takes 200 seconds to complete delivery of the 10 M routes. However, by using the method provided in this embodiment of the present invention, the route delivery rate can be increased to 1 M per second, and it takes only 10 seconds to complete delivery of the 10 M routes, increasing the delivery rate by 20 times.

Optionally, the NP of the line card box may include a plurality of processor cores. The plurality of processor cores may process the write operation packet in parallel, in other words, obtain the write operation information from the write operation packet in parallel. This can ensure efficiency in processing the write operation packet, thereby improving efficiency in updating the forwarding entry. Correspondingly, in the foregoing step 104, when obtaining the write operation information from the write operation packet, the line card box may first determine, from the plurality of processor cores, a target processor core whose resource utilization is less than a utilization threshold, and then obtain the write operation information from the write operation packet by using the target processor core. When determining that there are a plurality of processor cores whose the resource utilization is less than the utilization threshold, the line card box may randomly select one of the processor cores as the target processor core. Allocating the write operation packet to a processor core whose resource utilization is relatively small can ensure load balancing among the plurality of processor cores, implementing efficient processing of the write operation packet.

Resource utilization may be processing resource utilization. The utilization threshold may be a preset fixed value, for example, may be 50%. Alternatively, the utilization threshold may be determined based on actual resource utilization of each processor core. For example, an average value of the resource utilization of the processor cores may be used as the utilization threshold. Alternatively, the resource utilization of the processor cores may be sorted in ascending order, and resource utilization ranked second is determined as the utilization threshold. The line card box may select, as the target processor core, a processor core that has lowest resource utilization. For example, the line card box may use an idle processor core as the target processor core.

For example, FIG. 6 is a schematic diagram of a partial structure of a line card box according to an embodiment of the present invention. As shown in FIG. 6, an NP of the line card box may include a distribution module and a total of four processor cores K1 to K4. After receiving a packet from a server, the distribution module may distribute, based on resource utilization of each processor core, the packet to the processor core. It is assumed that when a currently received write operation packet is a write operation packet P1, and the distribution module detects that the processor core K4 has lowest resource utilization. Therefore, the write operation packet P1 may be distributed to the processor core K4 for processing.

In this embodiment of the present invention, a plurality of pieces of write operation information generated by the server based on one forwarding entry may be encapsulated into different write operation packets. Therefore, besides performing memory write operations according to a sequence of write operation information in each write operation packet, the NP further needs to perform the memory write operations according to a receiving sequence of the write operation packets. To be specific, for two write operation packets received one after another, the NP needs to first write, into the memory, all write operation data in each piece of write operation information in the write operation packet received at first, and then can perform a memory write operation on write operation data in each piece of write operation information in the write operation packet received afterwards, thereby ensuring that the forwarding entry is accurately updated.

Optionally, a sequence-preserving access module may further be deployed in the NP of the line card box. Each processor core may send obtained write operation information to the sequence-preserving access module. According to the receiving sequence of the write operation packets and the sequence of the write operation information in each write operation packet, the sequence-preserving access module may write the write operation data into the memory in sequence based on a write operation address in the write operation information of the write operation packet. The memory may be deployed inside the NP or may be deployed outside the NP. This is not limited in this embodiment of the present invention.

For example, referring to FIG. 6, it is assumed that the server sends a total of four write operation packets P1 to P4, and the four write operation packets are sent in the following sequence: P1, P2, P3, and P4. After receiving the four write operation packets in sequence, the distribution module of the NP distributes the write operation packets to different processor cores, for example, distributing the write operation packet P1 to the processor core K4, and distributing the write operation packet P4 to the processor core K2. The four processor cores K1 to K4 may separately obtain write operation information from a received write operation packet in parallel, and send the obtained write operation information to the sequence-preserving access module. After receiving the write operation information sent by each processor core, the sequence-preserving access module may first write, into the memory in sequence, write operation data in at least one piece of write operation information in the write operation packet P1, and then write, into the memory in sequence, write operation data in the write operation packets P2 to P4.

Step 106: The line card box collects statistics on a total quantity of memory write operations performed based on write operation packets of a same sequence number, to obtain a correspondence between the sequence number and the total quantity.

In this embodiment of the present invention, the write operation packet sent by the server may include a sequence number. Based on the write operation information in the received write operation packet, each time after performing one memory write operation, the line card box may use the sequence number of the write operation packet as an index, and collects statistics on a total quantity of performed memory write operations corresponding to the index. In other words, the line card box may collect the statistics on the total quantity of memory write operations performed based on the write operation packets of the same sequence number, to obtain the correspondence between the sequence number and the total quantity. The write operation packets of the same sequence number are write operation packets whose sequence numbers are equal.

Figure 7:
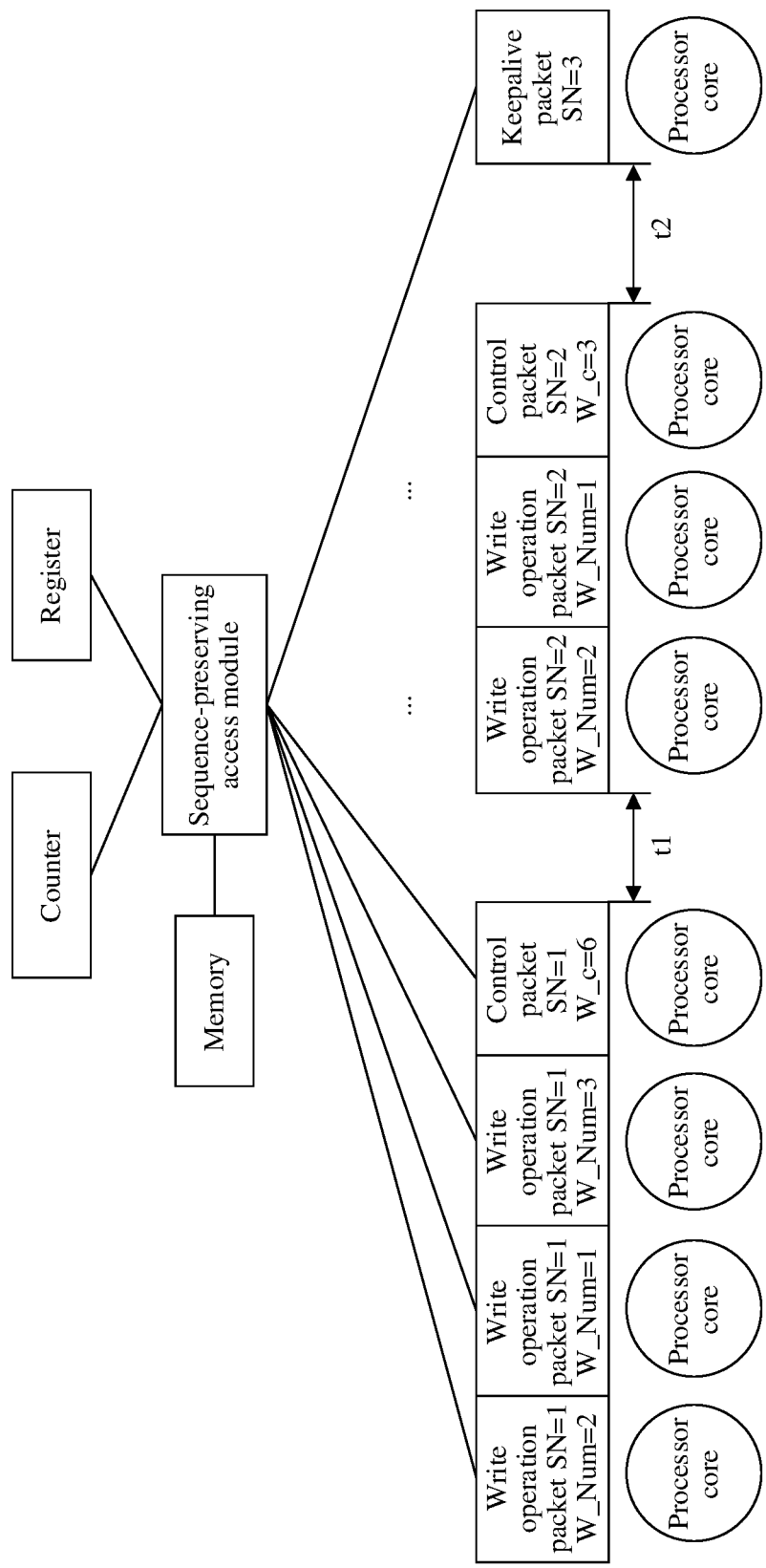
FIG. 7 is an architectural diagram of a line card box according to an embodiment of the present invention.

Optionally, as shown in FIG. 7, the line card box may be provided with a counter. The counter may be deployed inside the NP or may be deployed outside the NP. This is not limited in this embodiment of the present invention. The counter may be configured to store total quantities corresponding to different sequence numbers. Each time after performing one write operation based on a write operation packet, the line card box may obtain, from the counter, a total quantity corresponding to a sequence number of the write operation packet, and add 1 to the total quantity, thereby collecting, in real time, statistics on the total quantity corresponding to the sequence number.

For example, referring to FIG. 7, it is assumed that the line card box receives, in sequence, three write operation packets whose sequence numbers are 1 (namely, SN=1), where the first write operation packet includes two pieces of write operation information (namely, W_Num=2), the second write operation packet includes one piece of write operation information (namely, W_Num=1), and the third write operation packet includes three pieces of write operation information (namely, W_Num=3). Then, the NP of the line card box may perform six memory write operations based on the write operation information in the three write operation packets. Each time after performing one memory write operation, the NP may update a total quantity that is corresponding to SN=1 and that is stored in the counter. A total quantity corresponding to SN=1 obtained ultimately through updating is 6.

Figure 8:
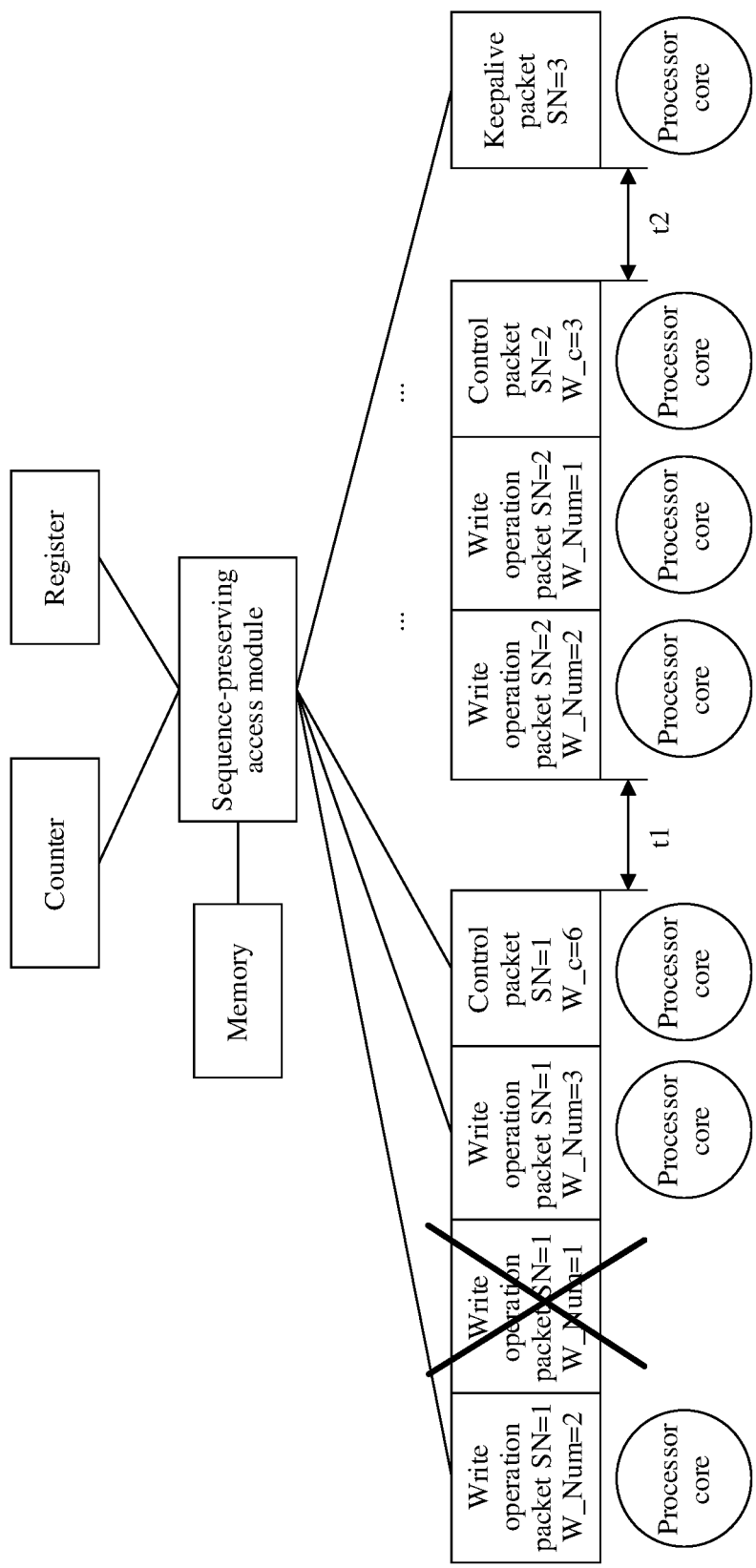
FIG. 8 is an architectural diagram of another line card box according to an embodiment of the present invention.

Alternatively, referring to FIG. 8, it is assumed that the second write operation packet whose SN is 1 and that is sent by the server is lost, and the line card box receives only two write operation packets whose SNs are 1. In one write operation packet, W_NUM=2, and in the other write operation packet, W_Num=3. The NP of the line card box may perform five memory write operations based on write operation information in the two write operation packets. Each time after performing one memory write operation, the NP may update a total quantity that is corresponding to SN=1 and that is stored in the counter. A total quantity corresponding to SN=1 obtained ultimately through updating is 5.

Step 107: The server sends a first control packet to the line card box.

In this embodiment of the present invention, to ensure that all the write operation data in the write operation packet sent by the server can be correctly written into the memory and ensure that the forwarding entry is accurately updated, the server may send one first control packet after sending one or more write operation packets (in other words, after sending one batch of write operation packet). The first control packet may include a count value, and the count value is a total quantity of pieces of write operation information included in a write operation packet sent by the server after a second control packet is sent. The second control packet is a previous control packet sent by the server before the first control packet. If the first control packet is an initial control packet sent by the server, the count value in the first control packet is a total quantity of pieces of write operation information included in a write operation packet sent before the first control packet.

Figure 9:
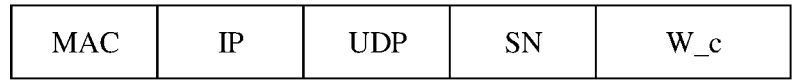
FIG. 9 is a schematic diagram of a structure of a control packet according to an embodiment of the present invention.

FIG. 9 is a schematic diagram of a structure of a control packet according to an embodiment of the present invention. It can be learned from FIG. 9 that each control packet sent by the server may include a MAC header field, an IP header field, a UDP header field, an SN field, and a W_c field. Definitions of the MAC header field, the IP header field, and the UDP header field are all same as those in the write operation packet. Details are not described herein again. In addition, an identifier used to indicate that a type of the packet is a control packet may be added to a source port number in the UDP header field of the control packet. For example, the identifier may be 1.

The SN field of the control packet is used to record a sequence number of the control packet. A sequence number of each control packet sent by the server may be equal to a sequence number of a previous write operation packet, and the sequence numbers of the control packets sent by the server increase in ascending order. The W_c field is used to record a count value. The count value is a total quantity of pieces of write operation information included in a write operation packet sent by the server after a previous control packet (namely, the second control packet), to be a specific, a total quantity of pieces of write operation information included in a write operation packet having a same sequence number as the current control packet. Sequence numbers being the same may mean that the sequence numbers are equal.

For example, as shown in FIG. 7 and FIG. 8, it is assumed that after sending three write operation packets whose SNs are 1, the server sends one first control packet whose SN is 1. A total quantity of pieces of write operation information included in the three write operation packets whose SNs are 1 is 6. Therefore, a count value included in the first control packet whose SN is 1 is 6, namely, W_c=6.

If the server sends one first control packet whose SN is 2 after sending two write operation packets whose SNs are 2, because a total quantity of pieces of write operation information included in the two write operation packets whose SNs are 2 is 3, as shown in FIG. 7 and FIG. 8, a count value included in the first control packet whose SN is 2 is 3, namely, W_c=3.

Step 108: The line card box detects whether a difference between a sequence number of the first control packet and a sequence number of a third control packet is a preset difference.

It can be learned from FIG. 7 to FIG. 9 that each control packet sent by the server may further include a sequence number, and sequence numbers of the control packets sent by the server increase in ascending order. For example, a difference between the sequence number of each control packet and a sequence number of a previous control packet may be 1. A control packet may be lost in a transmission process. Therefore, to ensure that a total quantity of performed write operations is detected based on a correct control packet, the line card box may first detect whether the difference between the sequence number of the first control packet and the sequence number of the third control packet is the preset difference. The third control packet is a previous control packet received by the line card box before the first control packet.

When detecting that the difference between the sequence number of the first control packet and the sequence number of the third control packet is the preset difference, the line card box may determine that no control packet is lost, and therefore may perform step 109. When detecting that the difference between the sequence number of the first control packet and the sequence number of the third control packet is not the preset difference, the line card box may determine that a control packet after the third control packet is lost, and therefore may perform step 112.

Optionally, the line card box may store the sequence number of a previous control packet. An initial value of the sequence number may be 0, and the sequence number of a previous control packet may be data not greater than 32 bits. The data may be stored in the memory of the line card box. Alternatively, as shown in FIG. 7 and FIG. 8, the line card box may be provided with a register, and the data may be stored in the register. After receiving the first control packet, the line card box may directly obtain the sequence number that is of a previous control packet (namely, the third control packet) and that is stored in the line card box, and detect the difference between the sequence numbers. After detecting the difference, the line card box may further update the sequence number that is of a previous control packet and that is stored in the line card box to the sequence number of the first control packet. In other words, the sequence number of the first control packet may be used as a new sequence number of a previous control packet. In this way, the line card box may subsequently continue to calculate a difference and perform difference detection based on the sequence number of a previous control packet.

For example, it is assumed that the difference threshold is 1, that the sequence number of the first control packet currently received by the line card box is 2, namely, SN=2, and that the sequence number that is of the third control packet and that is stored in the register of the line card box is 1. Then, because the difference between the sequence number of the first control packet and the sequence number of the third control packet is 1, step 109 may be performed, and the sequence number that is of a previous control packet and that is stored in the register may be updated to 2. If the sequence number that is of the third control packet and that is stored in the register of the line card box is 0 (in other words, no other control packet is received before the third control packet), because the difference between the sequence number of the first control packet and the sequence number stored in the register is not 1, the line card box may determine that a control packet is lost and therefore may perform step 112, and may further update the sequence number that is of a previous control packet and that is stored in the register to 2.

In this embodiment of the present invention, if the NP of the line card box includes a plurality of processor cores, as shown in FIG. 7 and FIG. 8, after receiving a control packet, the line card box may also distribute, based on resource utilization of each processor core, the control packet to a corresponding processor core for processing.

Step 109: The line card box detects whether a total quantity of memory write operations performed after the second control packet is received is equal to the count value.

When detecting that the difference between the sequence number of the first control packet and the sequence number of the third control packet is the preset difference, the line card box may determine that no control packet is lost, and may determine that the third control packet is the second control packet. Therefore, the line card box may continue to detect whether a count value in the first control packet is equal to a total quantity of memory write operations performed by the line card box after receiving the third control packet. When the count value is not equal to the total quantity, the line card box may determine that a write operation packet is lost or that a memory write operation fails to be performed, and therefore may perform step 110. When the count value is equal to the total quantity, the line card box may determine that all memory write operations are performed successfully. Therefore, a current state can remain unchanged.

It can be learned from FIG. 4, FIG. 7, and FIG. 8 that a write operation packet sent by the server may include a sequence number, and sequence numbers of all write operation packets sent between two control packets by the server are equal to a sequence number of the latter one of the sent control packets. In other words, a sequence number of each control packet is equal to a sequence number of a previous write operation packet sent before the control packet. For example, referring to FIG. 7, a sequence number of a control packet sent by the server after sending two write operation packets whose sequence numbers are 2 (namely, SN=2) is also 2. For example, as described in step 106, the line card box may collect statistics on a quantity of performed memory write operations by using the sequence number of the write operation packet as an index, to obtain a correspondence between the sequence number and the total quantity. Therefore, in a process of performing the foregoing step 108, the line card box may first obtain, from a pre-generated correspondence between a sequence number and a total quantity, a total quantity corresponding to the sequence number of the first control packet. Then, the line card box can detect whether the count value is equal to the total quantity corresponding to the first control packet.

For example, it is assumed that the sequence number of the first control packet is 1, namely, SN=1. It can be learned from FIG. 7 and FIG. 8 that in the control packet whose SN is 1, W_c=6, in other words, the count value is 6. After receiving the first control packet, the line card box may read, from the counter, the total quantity corresponding to SN=1. If the total quantity that is corresponding to SN=1 and that is read by the line card box is 6, the count value is equal to the total quantity. Therefore, the line card box may determine that all memory write operations indicated by the server are performed successfully. Therefore, a current state can remain unchanged. If the total quantity that is corresponding to SN=1 and that is read by the line card box is 5, the count value is not equal to the total quantity. Therefore, the line card box may determine that a write operation packet is lost or that a memory write operation fails to be performed, and therefore may perform step 110.

Optionally, because there is a need to re-send a write operation packet, after detecting whether the count value is equal to the total count, the line card box may further clear the collected total quantity corresponding to the sequence number of the first control packet, and may also clear a total quantity corresponding to a sequence number greater than the sequence number of the first control packet. This can ensure that when receiving write operation packets of a same sequence number that are re-sent by the server, the line card box can accurately collect statistics on a total quantity corresponding to the sequence number. For example, after completing detection on the total quantity corresponding to SN=1, the line card box may clear the collected total quantity corresponding to SN=1, and may also clear a total quantity corresponding to an SN greater than 1. For example, if the correspondence stored in the line card box further records a total quantity corresponding to SN=2, the total quantity corresponding to SN=2 may also be cleared. In this way, when receiving a write operation packet whose SN is 1 and that is re-sent by the server or a write operation packet whose SN is greater than 1 and that is re-sent by the server, the line card box may recollect statistics on a total quantity corresponding to each sequence number.

Step 110: The line card box sends first prompt information to the server.

When detecting that the count value in the first control packet is not equal to the total quantity of memory write operations performed after the second control packet is received, the line card box may determine that a write operation packet is lost or a memory write operation fails to be performed, and therefore may send the first prompt information to the server. The first prompt information may be used to indicate to the server that a write operation packet sent after the second control packet is lost, so that the server re-sends the write operation packet sent after the second control packet.

Optionally, the first prompt information may include the sequence number of the first control packet. Then the first prompt information may indicate to the server that a write operation packet that is sent after the second control packet and whose sequence number is the same as that of the first control packet is lost. Alternatively, the first prompt information may further include a sequence number of the second control packet. Then the first prompt information may indicate to the server that a write operation packet that is sent after the second control packet and that has a sequence number whose difference with the sequence number of the second control packet is the preset difference is lost. Optionally, the first prompt information may further include an identifier that is used to indicate that a type of the lost packet is a write operation packet. For example, the identifier may be 1.

For example, the first prompt information sent by the line card box to the server may include the sequence number 1 of the first control packet, and the first prompt information may be used to indicate to the server that a write operation packet whose SN is 1 is lost.

Step 111: The server re-sends, to the line card box, the write operation packet sent after the second control packet.

When receiving the first prompt information sent by the line card box, the server may determine that a write operation packet sent after the second control packet is lost. To ensure that the forwarding entry is normally updated, the server may re-send the write operation packet sent after the second control packet. After receiving the write operation packet re-sent by the server based on the first prompt information, the line card box may perform again the method described in the foregoing step 104.

Optionally, the first prompt information may include the sequence number of the first control packet and the identifier that is used to indicate that the type of the lost packet is a write operation packet. Then the server may re-send, based on the sequence number of the first control packet, a write operation packet whose sequence number is the same as that of the first control packet. For example, assuming that the sequence number included in the first prompt information is SN=1, the server may re-send the three write operation packets whose SNs are 1 to the line card box.

Step 112: The line card box sends second prompt information to the server.

In the foregoing step 108, when detecting that the difference between the sequence number of the first control packet and the sequence number of the third control packet is not the preset difference, the line card box may determine that a control packet sent after the third control packet is lost, and therefore may send the second prompt information to the server, where the second prompt information is used to indicate to the server that the control packet sent after the third control packet is lost, so that the server may re-send a write operation packet after the third control packet.

Optionally, the second prompt information may include the sequence number of the third control packet. Alternatively, in addition to the sequence number of the third control packet, the second prompt information may further include the sequence number of the first control packet. Then, the second prompt information may indicate to the server that a control packet sent between the third control packet and the first control packet is lost. Alternatively, the line card box may further obtain a sequence number of the lost control packet through calculation based on the sequence number of the third control packet, the sequence number of the first control packet, and the preset difference. The second prompt information may include the sequence number of the lost control packet, so that the server may directly determine the lost control packet based on the second prompt information. Optionally, the second prompt information may further include an identifier that is used to indicate that a type of the lost packet is a control packet. For example, the identifier may be 2.

For example, it is assumed that the preset difference is 1, that the sequence number of the third control packet (namely, the sequence number stored in the register) is SN=1, and that the sequence number of the first control packet SN=3. The sequence number included in the second prompt information may be SN=1, and the second prompt information may indicate to the server that a control packet sent after the control packet whose SN is 1 is lost. Alternatively, the second prompt information may include SN=1 and SN=3, and the second prompt information may indicate to the server that a control packet sent between the control packet whose SN is 1 and the control packet whose SN is 3 is lost. Alternatively, the line card box may learn, through calculation based on the sequence number SN=1 of the third control packet, the sequence number SN=3 of the first control packet, and the preset difference 1, that the sequence number of the lost control packet is SN=2. Therefore, the second prompt information may include SN=2, and the second prompt information may indicate to the server that the control packet whose SN is 2 is lost.

Step 113: The server may re-send, to the line card box based on the second prompt information, a write operation packet sent after the third control packet.

When receiving the second prompt information sent by the line card box, the server may determine that the control packet sent after the third control packet is lost. As a result, the line card box cannot detect whether all write operation data in the write operation packet sent after the third control packet is successfully written into the memory. Therefore, the server may re-send, to the line card box, the write operation packet sent after the third control packet.

For example, assuming that the sequence number, of the lost control packet, included in the second prompt information is SN=2, the server may re-send the write operation packets whose SNs are 2 to the line card box.

Figure 10:
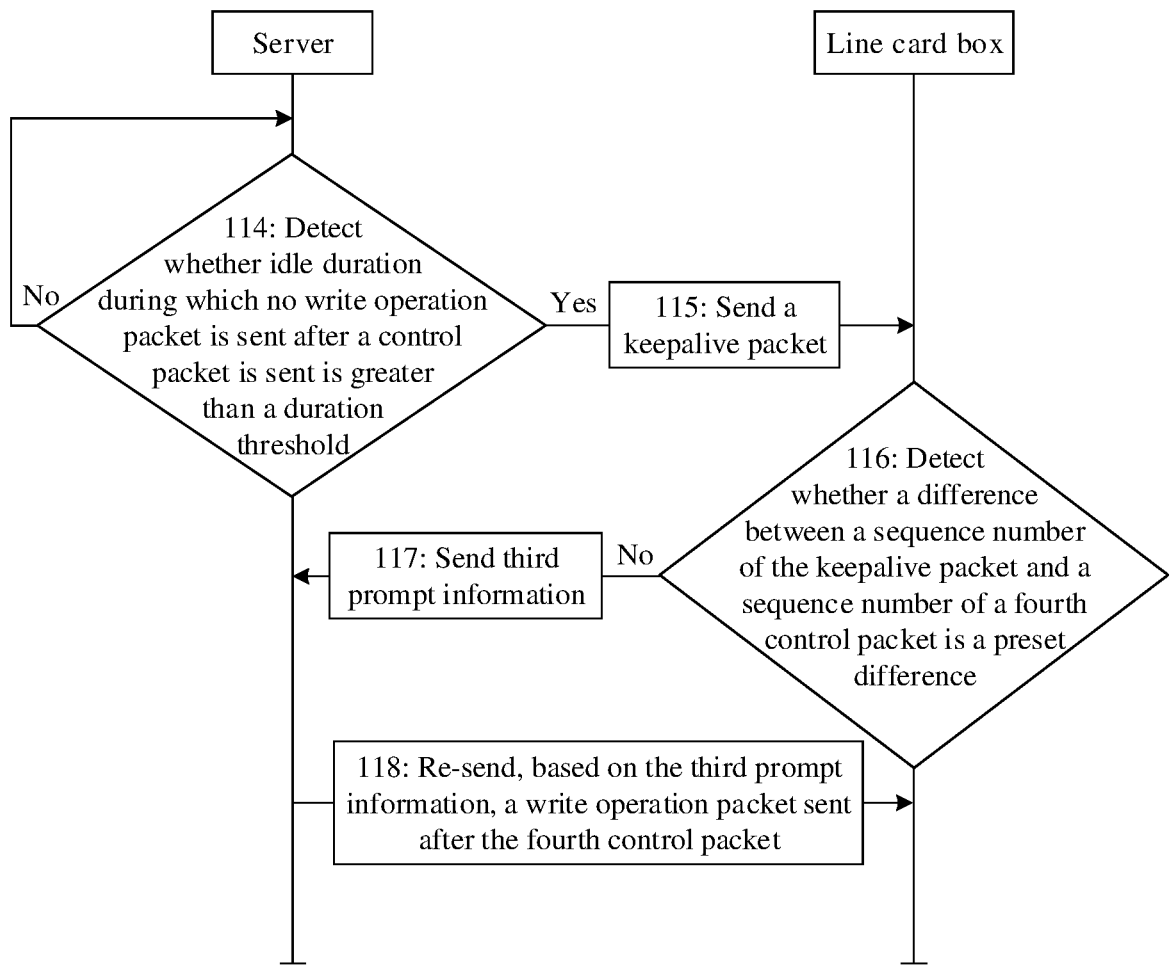
FIG. 10 is a flowchart of a method for re-sending a write operation packet according to an embodiment of the present invention.

FIG. 10 is a flowchart of a method for re-sending a write operation packet according to an embodiment of the present invention. An application scenario of the method may be the same as that of the embodiment shown in FIG. 3. Referring to FIG. 10, the method may include the following steps.

Step 114: The server detects whether idle duration during which no write operation packet is sent after a control packet is sent is greater than a duration threshold.

In this embodiment of the present invention, each time after sending a control packet, the server may detect whether idle duration during which no write operation packet is sent after the control packet is sent is greater than the duration threshold. When the idle duration is greater than the duration threshold, the server may perform step 115. When the idle duration is not greater than the duration threshold, the server may continue to perform step 114, in other words, continue to detect whether the idle duration is greater than the duration threshold. The duration threshold T1 may be a fixed value preset in the server. For example, the duration threshold T1 may be 1 second.

Step 115: The server sends a keepalive packet to the line card box.

When detecting that the idle duration during which no write operation packet is sent after the control packet is sent is greater than the duration threshold, the server may send the keepalive packet to the line card box. The line card box may receive the keepalive packet sent by the server. The keepalive packet may include a sequence number, and a difference between the sequence number of the keepalive packet and the sequence number of a previous control packet sent before the keepalive packet is a preset difference.

Figure 11:
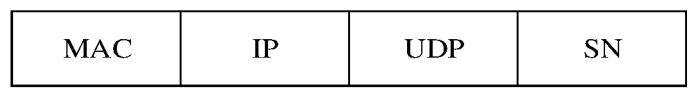
FIG. 11 is a schematic diagram of a structure of a keepalive packet according to an embodiment of the present invention.

FIG. 11 is a schematic diagram of a structure of a keepalive packet according to an embodiment of the present invention. It can be learned from FIG. ii that the keepalive packet sent by the server may include a MAC header field, an IP header field, a UDP header field, and an SN field. Definitions of the MAC header field, the IP header field, and the UDP header field are all same as those in the write operation packet. Details are not described herein again. In addition, an identifier used to indicate that a type of the packet is a keepalive packet may be added to a source port number in the UDP header field in the keepalive packet. For example, the identifier may be 2. The SN field of the keepalive packet may be used to record the sequence number of the keepalive packet.

For example, referring to FIG. 7 and FIG. 8, after sending a control packet whose SN is 1, the server may detect idle duration during which no write operation packet is sent. If the idle duration is t1, and t1<T1, in other words, the server sends a write operation packet whose SN is 2 after a duration of t1, the server does not need to send a keepalive packet. When detecting that idle duration t2 during which no write operation packet is sent after the control packet whose SN is 2 is sent is greater than the duration threshold T1, the server may send a keepalive packet. A sequence number of the keepalive packet may be SN=3. In other words, a difference between the sequence number of the keepalive packet and the previous control packet is 1.

Optionally, in this embodiment of the present invention, after sending the keepalive packet to the line card box, the server may also perform the method described in the foregoing step 114. In other words, the server may detect whether idle duration during which no write operation packet is sent after the keepalive packet is sent is greater than the duration threshold. If the idle duration is greater than the duration threshold, the server may continue to perform step 115, in other words, continue to send a keepalive packet to the line card box. In addition, a difference between a sequence number of the keepalive packet and a sequence number of the previous keepalive packet is also the preset difference.

Step 116: The line card box detects whether a difference between the sequence number of the keepalive packet and a sequence number of a fourth control packet is the preset difference.

After receiving the keepalive packet sent by the server, the line card box may detect whether the difference between the sequence number of the keepalive packet and the sequence number of the fourth control packet is the preset difference. The fourth control packet is a previous control packet received by the line card box before the keepalive packet. When detecting that the difference between the sequence number of the keepalive packet and the sequence number of the fourth control packet is not the preset difference, the line card box may determine that a control packet sent after the fourth control packet is lost, and therefore may perform step 117. When detecting that the difference between the sequence number of the keepalive packet and the sequence number of the fourth control packet is the preset difference, the line card box may determine that no control packet is lost. Therefore, a current state can remain unchanged.

Optionally, as described above, the line card box may store a sequence number of a previous control packet in a memory or a register. Therefore, after receiving the keepalive packet, the line card box may directly detect whether a difference between the sequence number of the keepalive packet and the sequence number that is of a previous control packet and that is stored in the line card box is the preset difference. In addition, after completing difference detection, the line card box may further update the sequence number that is of a previous control packet and that is stored in the line card box to the sequence number of the keepalive packet, so that the line card box may subsequently continue to calculate a difference and perform difference detection based on the sequence number of a previous control packet.

Figure 12:
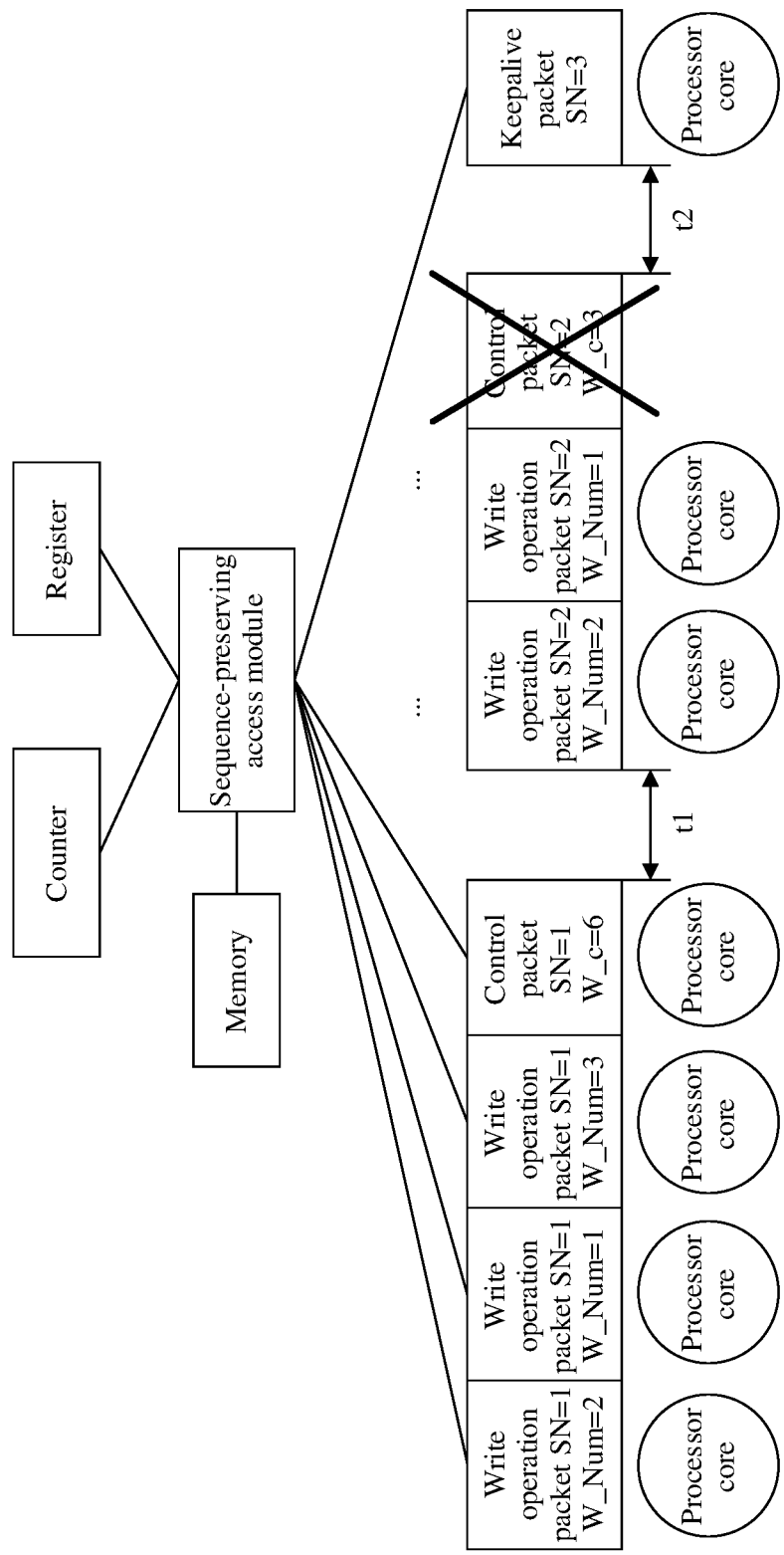
FIG. 12 is an architectural diagram of still another line card box according to an embodiment of the present invention.

For example, it is assumed that the preset difference is 1, and that the server sends the keepalive packet whose SN is 3 after sending the control packet whose SN is 2. When the line card box receives the keepalive packet whose SN is 3, the sequence number that is of a previous control packet (namely, the fourth control packet) and that is stored in the register is SN=2. Because a difference between the two sequence numbers is the preset difference, the line card box may update the sequence number that is of a previous control packet and that is stored in the register to 3. Alternatively, as shown in FIG. 12, if the control packet whose SN is 2 is lost in a transmission process, when receiving the keepalive packet whose SN is 3, the line card box may detect that the sequence number that is of a previous control packet (namely, the fourth control packet) and that is stored in the register is SN=1. Because a difference between the two sequence numbers is not 1, the line card box may perform step 117 and update the sequence number that is of a previous control packet and that is stored in the register to 3.

In this embodiment of the present invention, if an NP of the line card box includes a plurality of processor cores, as shown in FIG. 7, FIG. 8, and FIG. 12, after receiving a keepalive packet, the line card box may also distribute, based on resource utilization of each processor core, the keepalive packet to a corresponding processor core for processing.

Step 117: The line card box sends third prompt information to the server.

When detecting that the difference between the sequence number of the keepalive packet and the sequence number of the fourth control packet is not the preset difference, the line card box may determine that the control packet sent after the fourth control packet is lost, and therefore may send the third prompt information to the server, where the third prompt information is used to indicate to the server that the control packet sent after the fourth control packet is lost.

Optionally, the third prompt information may include the sequence number of the fourth control packet. Alternatively, in addition to the sequence number of the fourth control packet, the third prompt information may further include the sequence number of the keepalive packet. Then, the third prompt information may indicate to the server that a control packet sent between the fourth control packet and the keepalive packet is lost. Alternatively, the line card box may further obtain a sequence number of the lost control packet through calculation based on the sequence number of the fourth control packet, the sequence number of the keepalive packet, and the preset difference. The third prompt information may include the sequence number of the lost control packet, so that the server may directly determine the lost control packet based on the third prompt information. Optionally, the third prompt information may further include an identifier that is used to indicate that a type of the lost packet is a control packet. For example, the identifier may be 2.

For example, it is assumed that the preset difference is 1, and that when the line card box receives the keepalive packet whose SN is 3, the sequence number that is of a previous control packet (namely, the fourth control packet) and that is stored in the register is SN=1. The third prompt information sent by the line card box to the server may include the sequence number SN=1, and the third prompt information may indicate to the server that a control packet sent after the control packet whose SN is 1 is lost. Alternatively, the third prompt information may include SN=1 and SN=3, and the third prompt information may indicate to the server that a control packet sent between the control packet whose SN is 1 and the keepalive packet whose SN is 3 is lost. Alternatively, the line card box may learn, through calculation based on the sequence number SN=1 of the fourth control packet, the sequence number SN=3 of the keepalive packet, and the preset difference 1, that the sequence number of the lost control packet is SN=2. Therefore, the third prompt information may include SN=2, and the third prompt information may indicate to the server that the control packet whose SN is 2 is lost.

Step 118: The server may re-send, to the line card box based on the third prompt information, a write operation packet sent after the fourth control packet.

When receiving that third prompt information that is sent by the line card box and that is used to indicate that the control packet sent after the fourth control packet is lost, the server may re-send, to the line card box, the write operation packet sent after the fourth control packet.

For example, assuming that the sequence number included in the third prompt information is SN=1, the server may re-send a write operation packet sent after the control packet whose SN is 1. For example, the server may re-send a write operation packet whose SN is 2.

In this embodiment of the present invention, each time after sending a write operation packet, the server does not need to wait for a response from the line card box, and may continue to send a subsequent write operation packet, thereby ensuring high-rate delivery of routes. In addition, because there is a need to re-send a write operation packet, the server may cache write operation information of a sent write operation packet or may directly cache a sent write operation packet, and cache duration T2 of the write operation information or the write operation packet is far greater than the duration threshold T1. For example, when the duration threshold is 1 second, the cache duration may be 1 minute. Therefore, each time when receiving the first prompt information, the second prompt information, or the third prompt information sent by the line card box, the server may re-send a corresponding write operation packet based on the cached write operation information or write operation packet.

Optionally, to ensure that the forwarding entry is correctly updated, when determining, based on the received first prompt information, that a write operation packet sent after the second control packet is lost, the server needs to re-send all write operation packets sent after the second control packet. When determining, based on the received second prompt information or third prompt information, that a control packet sent after a particular control packet is lost, the server needs to re-send all write operation packets sent after the particular control packet.

Figure 13:
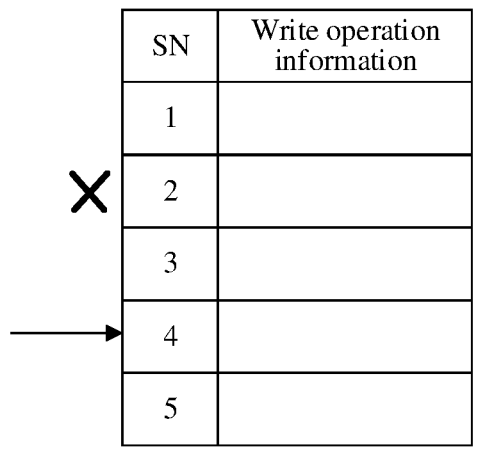
FIG. 13 is a schematic diagram of caching write operation information by a server according to an embodiment of the present invention.

For example, referring to FIG. 13, it is assumed that a server has sent in sequence write operation packets whose SNs are 1 to 4, and that when intending to send a write operation packet whose SN is 5, the server receives first prompt information sent by a line card box, where an SN included in the first prompt information is 2, in other words, the prompt information may indicate that a write operation packet whose SN is 2 is lost. In this case, the server may re-send, based on the prompt information, all the write operation packets whose SNs are 2 to 4, and then send the write operation packet whose SN is 5. Alternatively, it is assumed that when intending to send a write operation packet whose SN is 5, the server receives second prompt information sent by a line card box, where an SN included in the second prompt information is 1, in other words, the prompt information may indicate that a control packet sent after a control packet whose SN 1 is lost. In this case, the server may re-send, based on the prompt information, all the write operation packets whose SNs are 2 to 4, and then send the write operation packet whose SN is 5. In a process of re-sending a write operation packet, each time after sending write operation packets of a same sequence number, the server needs to send a control packet of the same sequence number, and then continues to send a write operation packet of a next sequence number. For example, after sending two write operation packets whose SNs are 2, the server may send a control packet whose SN is 2, and then continues to send a write operation packet whose SN is 3.

It can be learned from the foregoing analysis that in a scenario in which a write operation packet is lost, the line card box may detect, in a timely manner based on a received control packet, that a write operation packet is lost, and send the first prompt information to the server in a timely manner. Duration from sending a write operation packet to receiving the first prompt information by the server is usually with 100 microseconds (μs), but the cache duration T2 for which the server caches write operation information or a write operation packet is far greater than 100 μs. This can ensure that the lost write operation packet is re-sent in a timely manner.

In a scenario in which a control packet is lost, the line card box needs to determine, based on a control packet or a keepalive packet sent afterwards, that a control packet is lost. Because idle duration before a keepalive packet is sent is at least T1, required duration from sending a write operation packet to receiving the second prompt information or the third prompt information by the server is at most slightly greater than T1. However, the cache duration T2 for which the server caches write operation information or a write operation packet is far greater than T1. This can ensure that a write operation packet is re-sent in a timely manner.

Optionally, before the foregoing step 111, step 113, or step 118, in other words, before re-sending a write operation packet, the server may further send a reset packet to the line card box first, where the reset packet includes a reset sequence number. A difference between a sequence number of an initial write operation packet re-sent by the server and the reset sequence number is the preset difference. The reset packet may be used to indicate the line card box to update the sequence number that is of a previous control packet and that stored in the line card box to the reset sequence number. As instructed by the reset packet, the line card box updates the sequence number that is of a previous control packet and that is stored in the line card box to the reset sequence number. This can ensure that after receiving a write operation packet and a control packet that are re-sent by the server, the line card box may accurately determine, based on the reset sequence number, whether a control packet is lost.

For example, assuming that in any one of the foregoing step 111, step 113, and step 118, a sequence number of an initial write operation packet that the server intends to re-send is SN=2, the reset sequence number in the reset packet sent by the server to the line card box may be SN=1. After receiving the reset packet, the line card box may update the sequence number that is of a previous control packet and that is stored in the memory or the register to SN=1. Therefore, when receiving the write operation packet whose SN is 2 and that is re-sent by the server and receiving a subsequent control packet, the line card box can accurately determine whether a control packet is lost.

It should be noted that an order of the steps in the data processing method provided in this embodiment of the present invention may be properly adjusted, and a step may also be accordingly added or deleted as required. For example, step 108 may be deleted as required, step 106 to step 113 may be all deleted as required, or step 114 to step 118 may be all deleted as required. Any variation readily figured out by a person skilled in the art within the technical scope disclosed in this application shall fall within the protection scope of this application, and details are not described herein.

In summary, in the forwarding entry update method provided in this embodiment of the present invention, the write operation information in the write operation packet sent by the server to the line card box includes the write operation data and the write operation address. The line card box may directly write the write operation data into the memory based on the write operation address, to update the forwarding entry. The line card box needs to perform only the memory write operation, without a need to calculate the write operation data. Therefore, a rate at which the server delivers the write operation packet is not restricted by performance of line card box, effectively improving a rate of delivering a forwarding entry and efficiency in updating the forwarding entry. In addition, the server may further send, to the line card box, a control packet that carries a count value. When detecting, based on the control packet, that a write operation packet is lost, the line card box may indicate the server to re-send the write operation packet, thereby ensuring reliability in updating the forwarding entry.

Figure 14:
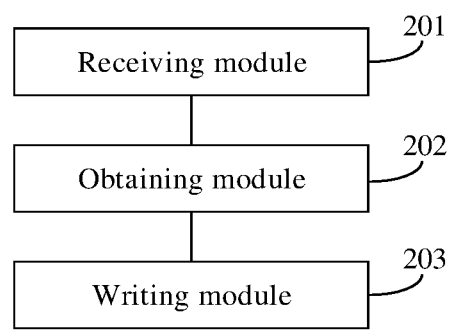
FIG. 14 is a schematic diagram of a structure of a forwarding entry update apparatus according to an embodiment of the present invention.

FIG. 14 is a schematic diagram of a structure of a forwarding entry update apparatus according to an embodiment of the present invention. The apparatus may be applied to a packet receive end, for example, may be applied to a line card box 02 in the routing system shown in FIG. 1. As shown in FIG. 14, the apparatus may include a receiving module 201, an obtaining module 202, and a writing module 203.

The receiving module 201 is configured to receive a write operation packet, where the write operation packet includes write operation information, the write operation information includes write operation data and a write operation address, the write operation data is used to indicate a to-be-updated forwarding entry, and the write operation address is used to indicate an address to which the write operation data is to be written in a memory.

For implementation of a function of the receiving module 201, refer to related descriptions of step 103 in the foregoing method embodiment.

The obtaining module 202 may be configured to obtain the write operation information from the write operation packet. For implementation of a function of the obtaining module 202, refer to related descriptions of step 104 in the foregoing method embodiment.

The writing module 203 may be configured to write the write operation data into the memory based on the write operation address in the write operation information. For implementation of a function of the writing module 203, refer to related descriptions of step 105 in the foregoing method embodiment.

Optionally, the receiving module 201 may further be configured to receive a first control packet after the writing module 203 writes the write operation data into the memory, where the first control packet includes a count value, the count value is a total count of write operation information included in a write operation packet sent between a second control packet and the first control packet, and the second control packet is a previous control packet sent before the first control packet. For implementation of a function of the receiving module 201, refer to related descriptions of step 107 in the foregoing method embodiment.

Figure 15:
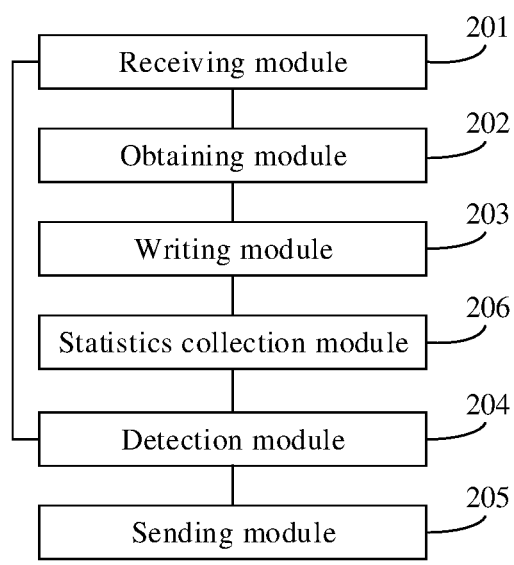
FIG. 15 is a schematic diagram of a structure of another forwarding entry update apparatus according to an embodiment of the present invention.

Referring to FIG. 15, the apparatus may further include a detection module 204 and a sending module 205.

The detection module 204 may be configured to detect whether a total quantity of memory write operations performed after the second control packet is received is equal to the count value, where the memory write operation is an operation of writing write operation data into the memory.

The sending module 205 may be configured to send first prompt information when the count value is not equal to the total quantity, where the first prompt information is used to indicate that a write operation packet sent after the second control packet is lost. For implementation of a function of the sending module 205, refer to related descriptions of step 110 in the foregoing method embodiment.

The receiving module 201 may be further configured to receive the write operation packet re-sent based on the first prompt information. For implementation of a function of the receiving module 201, refer to related descriptions of step 111 in the foregoing method embodiment.

Optionally, each control packet further includes a sequence number, and sequence numbers of control packets sent by a packet transmit end increase in ascending order. The detection module 204 may be further configured to after the receiving module 201 receives the first control packet, detect whether a difference between a sequence number of the first control packet and a sequence number of a third control packet is a preset difference, where the third control packet is a previous control packet received before the first control packet, and when the difference between the sequence number of the first control packet and the sequence number of the third control packet is the preset difference, determine the third control packet as the second control packet, and detect whether a total quantity of memory write operations performed after the third control packet is received is equal to the count value.

For implementation of a function of the detection module 204, refer to related descriptions of step 108 and step 109 in the foregoing method embodiment.

Optionally, the sending module 205 may be further configured to when the difference between the sequence number of the first control packet and the sequence number of the third control packet is not the preset difference, send second prompt information, where the second prompt information is used to indicate that a control packet sent after the third control packet is lost. For implementation of a function of the sending module 205, refer to related descriptions of step 112 in the foregoing method embodiment.

The receiving module 201 may be further configured to receive a write operation packet re-sent based on the second prompt information. For implementation of a function of the receiving module 201, refer to related descriptions of step 113 in the foregoing method embodiment.

Optionally, the receiving module 201 may be further configured to receive a keepalive packet, where the keepalive packet includes a sequence number, and a difference between the sequence number of the keepalive packet sent by the packet transmit end and a sequence number of a previous control packet sent before the keepalive packet is the preset difference. For implementation of a function of the receiving module 201, refer to related descriptions of step 115 in the foregoing method embodiment.

The detection module 204 may be further configured to detect whether a difference between the sequence number of the keepalive packet and a sequence number of a fourth control packet is the preset difference, where the fourth control packet is a previous control packet received before the keepalive packet. For implementation of a function of the detection module 204, refer to related descriptions of step 116 in the foregoing method embodiment.

Optionally, the sending module 205 may be further configured to when the difference between the sequence number of the keepalive packet and the sequence number of the fourth control packet is not the preset difference, send third prompt information, where the third prompt information is used to indicate that a control packet sent after the fourth control packet is lost. For implementation of a function of the sending module 205, refer to related descriptions of step 117 in the foregoing method embodiment.

The receiving module 201 is further configured to receive a write operation packet re-sent based on the third prompt information. For implementation of a function of the receiving module 201, refer to related descriptions of step 118 in the foregoing method embodiment.

Optionally, the write operation packet further includes a sequence number, and a sequence number of a write operation packet sent, by the packet transmit end, between two control packets is equal to a sequence number of a control packet sent later. As shown in FIG. 15, the apparatus may further include a statistics collection module 206, which may be configured to after the writing module writes the write operation data into the memory, collect statistics on a total quantity of memory write operations performed based on write operation packets of a same sequence number, to obtain a correspondence between the sequence number and the total quantity. For implementation of a function of the writing module 206, refer to related descriptions of step 106 in the foregoing method embodiment.

Correspondingly, the detection module 204 may be configured to obtain a total quantity corresponding to the sequence number of the first control packet, and detect whether the total quantity corresponding to the sequence number of the first control packet is equal to the count value.

In summary, this embodiment of the present invention provides the forwarding entry update apparatus. The write operation information in the write operation packet received by the apparatus includes the write operation data and the write operation address. Therefore, the apparatus may directly write the write operation data into the memory based on the write operation address, to update the forwarding entry. The apparatus needs to perform only a memory write operation, without a need to calculate the write operation data. Therefore, a rate at which the packet transmit end delivers a write operation packet is not restricted by processing performance of the apparatus, thereby effectively improving a rate of delivering a forwarding entry and efficiency in updating the forwarding entry.

Figure 16:
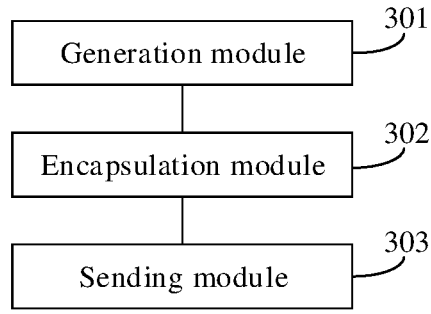
FIG. 16 is a schematic diagram of a structure of still another forwarding entry update apparatus according to an embodiment of the present invention.

FIG. 16 is a schematic diagram of a structure of another forwarding entry update apparatus according to an embodiment of the present invention. The apparatus may be applied to a packet transmit end, for example, may be applied to the server 01 in the routing system shown in FIG. 1. Referring to FIG. 16, the apparatus may further include a generation module 301, an encapsulation module 302, and a sending module 303.

The generation module 301 may be configured to generate write operation information based on a to-be-updated forwarding entry, where the write operation information includes write operation data and a write operation address, the write operation data is used to indicate the to-be-updated forwarding entry, and the write operation address is used to indicate an address to which the write operation data is to be written. For implementation of a function of the generation module 301, refer to related descriptions of step 101 in the foregoing method embodiment.

The encapsulation module 302 may be configured to encapsulate the generated write operation information into a write operation packet. For implementation of a function of the encapsulation module 302, refer to related descriptions of step 102 in the foregoing method embodiment.

The sending module 303 may be configured to send the write operation packet, where the write operation packet is used to indicate to write the write operation data into a memory based on the write operation address in the write operation information. For implementation of a function of the sending module 303, refer to related descriptions of step 103 in the foregoing method embodiment.

Optionally, the sending module 303 may be further configured to send a first control packet, where the first control packet includes a count value, the count value is a total count of write operation information included in a write operation packet sent after a second control packet is sent, and the second control packet is a previous control packet sent before the first control packet, when receiving first prompt information that is used to indicate that a write operation packet sent after the second control packet is lost, re-send the write operation packet sent after the second control packet, where the first prompt information is sent when a packet receive end detects that a total quantity of memory write operations performed after the second control packet is not equal to the count value.

For implementation of a function of the sending module 303, refer to related descriptions of step 107 and step 111 in the foregoing method embodiment.

Optionally, each control packet further includes a sequence number, and sequence numbers of control packets sent by the packet transmit end increase in ascending order, and the sending module 303 may be further configured to when receiving second prompt information that is used to indicate that a control packet sent after a third control packet is lost, re-send a write operation packet sent after the third control packet, where the second prompt information is sent when the packet receive end detects that a difference between a sequence number of the first control packet and a sequence number of the third control packet is not a preset difference, and the third control packet is a previous control packet received by the packet receive end before the first control packet.

For implementation of a function of the sending module 303, refer to related descriptions of step 113 in the foregoing method embodiment.

Figure 17:
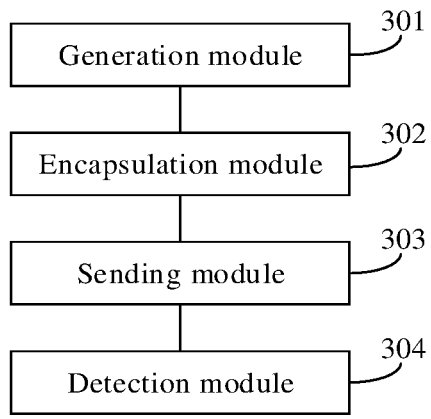
FIG. 17 is a schematic diagram of a structure of yet another forwarding entry update apparatus according to an embodiment of the present invention.

Optionally, as shown in FIG. 17, the apparatus may further include a detection module 304, which may be configured to each time after the sending module sends a control packet, detect whether idle duration during which no write operation packet is sent after the control packet is sent is greater than a duration threshold. For implementation of a function of the detection module 304, refer to related descriptions of step 114 in the foregoing method embodiment.

The sending module 303 may be further configured to when the idle duration is greater than the duration threshold, send a keepalive packet, where the keepalive packet includes a sequence number, and a difference between the sequence number of the keepalive packet and a sequence number of a previous control packet is the preset difference, and when receiving third prompt information that is used to indicate that a control packet sent after a fourth control packet is lost, re-send a write operation packet sent after the fourth control packet, where the third prompt information is sent when the packet receive end detects that a difference between the sequence number of the received keepalive packet and a sequence number of the fourth control packet is not the preset difference, and the fourth control packet is a previous control packet received by the packet receive end before the keepalive packet.

For implementation of a function of the sending module 303, refer to related descriptions of step 115 and step 118 in the foregoing method embodiment.

In summary, this embodiment of the present invention provides the forwarding entry update apparatus. The write operation information in the write operation packet sent by the apparatus includes the write operation data and the write operation address. Therefore, the packet receive end may directly write the write operation data into the memory based on the write operation address, to update the forwarding entry. The packet receive end needs to perform only a memory write operation, without a need to calculate the write operation data. Therefore, a rate at which the apparatus delivers a write operation packet is not restricted by processing performance of the packet receive end, thereby effectively improving a rate of delivering a forwarding entry and efficiency in updating the forwarding entry.

It should be understood that the forwarding entry update apparatus according to the embodiments of the present invention may be further implemented by using an application-specific integrated circuit (ASIC) or implemented by using a programmable logic device (PLD). The PLD may be a complex programmable logical device (CPLD), a field-programmable gate array (FPGA), a generic array logic (GAL), or any combination thereof. The forwarding entry update method provided in the foregoing method embodiment may also be implemented by using software. When the forwarding entry update method provided in the foregoing method embodiment is implemented by using software, each module in the forwarding entry update apparatus may also be a software module.

Figure 18:
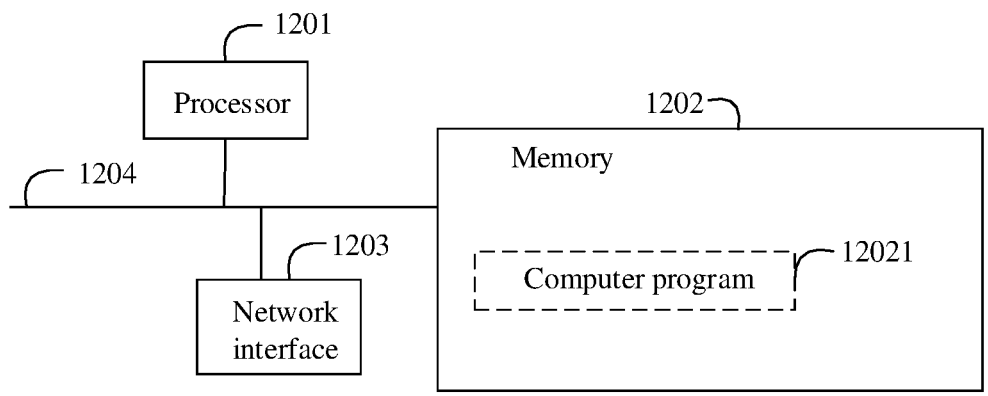
FIG. 18 is a schematic diagram of a structure of still yet another forwarding entry update apparatus according to an embodiment of the present invention.

FIG. 18 is a schematic diagram of a structure of still another forwarding entry update apparatus according to an embodiment of the present invention. Referring to FIG. 18, the apparatus may include a processor 1201, a memory 1202, a network interface 1203, and a bus 1204. The bus 1204 is configured to connect the processor 1201, the memory 1202, and the network interface 1203. A communication connection with another device may be implemented by using the network interface 1203 (which may be a wired or wireless interface). The memory 1202 stores a computer program 12021, and the computer program 12021 is configured to implement various application functions.

It should be understood that in the embodiment of the present invention, the processor 1201 may be a CPU, or the processor 1201 may be another general purpose processor, a digital signal processor (DSP), an application-specific integrated circuit (ASIC), a field programmable gate array (FPGA), a GPU or another programmable logic device, discrete gate or transistor logic device, discrete hardware component, or the like. The general purpose processor may be a microprocessor or any conventional processor or the like.

The memory 1202 may be a volatile memory or a nonvolatile memory, or may include a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchronous link dynamic random access memory (synchlink DRAM, SLDRAM), and a direct rambus dynamic random access memory (direct rambus RAM, DR RAM).

The bus 1204 may further include a power bus, a control bus, a status signal bus, and the like, in addition to a data bus. However, for clear description, various types of buses in the figure are marked as the bus 1204.

When the apparatus is applied to a packet transmit end, the processor 1201 is configured to execute the computer program 12021 stored in the memory 1202, and the processor 1201 executes the computer program 12021 to implement the methods described in step 101 to step 103, step 107, step 111, step 113 to step 115, and step 118 in the foregoing method embodiments. In addition, the methods described in the foregoing step 103, step 107, step 111, step 113, step 115, and step 118 may be implemented by the processor 1201 by executing the computer program 12021 to drive the network interface 1203.

When the apparatus is applied to a packet receive end, the processor 1201 is configured to execute the computer program stored in the memory 1202, and the processor 1201 executes the computer program 12021 to implement the methods described in step 104 to step 106, step 108 to step no, step 112, step 116, and step 117 in the foregoing method embodiments. In addition, the methods described in the foregoing step no, step 112, and step 117 may be implemented by the processor 1201 by executing the computer program 12021 to drive the network interface 1203.

An embodiment of the present invention further provides a computer-readable storage medium. The computer-readable storage medium stores an instruction. When the instruction stored in the computer-readable storage medium is run on a computer, the computer is enabled to perform the method performed by the server or the method performed by the line card box in the foregoing method embodiment.

An embodiment of the present invention further provides a computer program product that includes an instruction. When the instruction is run on a computer, the computer is enabled to perform the method performed by the server or the method performed by the line card box in the foregoing method embodiment.

An embodiment of the present invention further provides a forwarding entry sending system. The system may include a packet transmit end and a packet receive end. For example, the system may be the routing system shown in FIG. 1. The packet transmit end may be the server 01, and the packet receive end may be a line card box 02.

The packet transmit end may include the apparatus shown in FIG. 16 or FIG. 17, and the packet receive end may include the apparatus shown in FIG. 14 or FIG. 15.

All or some of the foregoing embodiments may be implemented by means of software, hardware, firmware, or any combination thereof. When software is used to implement the embodiments, the foregoing embodiments may be implemented completely or partially in a form of a computer program product. The computer program product includes one or more computer instructions. When the computer program instructions are loaded or executed on the computer, the procedure or functions according to the embodiments of the present invention are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

The foregoing descriptions are merely optional embodiments of this application, but are not intended to limit this application. Any modification, equivalent replacement, or improvement made without departing from the principle of this application should fall within the protection scope of this application.

What is claimed is:

1. A method, comprising:
   receiving, by a first network device, a write operation packet sent by a second network device, wherein the write operation packet comprises write operation information, wherein the write operation information comprises write operation data and a write operation address, wherein the write operation data indicates a forwarding entry, and wherein the write operation address indicates an address to which the write operation data is to be written in a memory;
   obtaining the write operation information from the write operation packet; and
   writing, by the first network device the write operation data into the memory according to the write operation address in the write operation information, wherein the writing updates a to-be-updated forwarding entry of a table of the first network device according to the forwarding entry indicated by the write operation data.

2. The method according to claim 1, wherein the method further comprises performing, after writing the write operation data into the memory:

receiving a first control packet, wherein the first control packet comprises a count value, wherein the count value is a total count of write operation information in a write operation packet sent between a second control packet and the first control packet, and wherein the second control packet is a control packet sent before the first control packet;

detecting whether a total quantity of memory write operations performed after the second control packet is received is equal to the count value, wherein each of the memory write operations is an operation of writing the write operation data into the memory;

sending first prompt information in response to the count value being not equal to the total quantity, wherein the first prompt information is used to indicate that a write operation packet sent after the second control packet is lost; and receiving the write operation packet that is re-sent according to the first prompt information.

3. The method according to claim 2, wherein each of the first control packet and the second control packet further comprises a sequence number, and wherein sequence numbers of control packets sent by a packet transmit end increase in ascending order; and wherein the method further comprises detecting, after the receiving the first control packet, whether a difference between the sequence number of the first control packet and a sequence number of a third control packet is a preset difference, wherein the third control packet is a control packet received before the first control packet; and wherein the detecting whether the total quantity of the memory write operations performed after the second control packet is received is equal to the count value comprises performing, in response to the difference between the sequence number of the first control packet and the sequence number of the third control packet being the preset difference:
  determining the third control packet as the second control packet; and
  detecting whether a total quantity of memory write operations performed after the third control packet is received is equal to the count value.

4. The method according to claim 2, wherein the write operation packet further comprises a sequence number, and a sequence number of a write operation packet sent by a packet transmit end between two control packets is equal to a sequence number of a control packet sent later;

wherein the method further comprises performing, after writing the write operation data into the memory:
  collecting statistics on a total quantity of memory write operations performed according to write operation packets of a same sequence number, and obtaining a correspondence between the sequence number and the total quantity; and wherein the detecting whether a total quantity of memory write operations performed after the second control packet is received is equal to the count value comprises:
  obtaining a total quantity corresponding to a sequence number of the first control packet; and
  detecting whether the total quantity corresponding to the sequence number of the first control packet is equal to the count value.

5. The method according to claim 3, wherein the method further comprises performing, after the detecting whether the difference between the sequence number of the first control packet and the sequence number of a third control packet is a preset difference:

sending second prompt information in response to the difference between the sequence number of the first control packet and the sequence number of the third control packet not being the preset difference, wherein the second prompt information indicates that a control packet sent after the third control packet is lost; and receiving a write operation packet that is re-sent according to the second prompt information.

6. The method according to claim 3, wherein the method further comprises:

receiving a keepalive packet sent by the packet transmit end, wherein the keepalive packet comprises a sequence number, and wherein a difference between the sequence number of the keepalive packet and a sequence number of a previous control packet sent before the keepalive packet is the preset difference;

detecting whether a difference between the sequence number of the keepalive packet and a sequence number of a fourth control packet is the preset difference, wherein the fourth control packet is a previous control packet received before the keepalive packet;

when the difference between the sequence number of the keepalive packet and the sequence number of the fourth control packet is not the preset difference, sending third prompt information, wherein the third prompt information is used to indicate that a control packet sent after the fourth control packet is lost; and receiving a write operation packet that is re-sent according to the third prompt information.

7. The method according to claim 1, wherein the writing the write operation data into the memory according to the write operation address in the write operation information comprises:

writing the write operation data into the memory in sequence according to the write operation address in each piece of write operation information according to a receiving sequence of the write operation packet and a sequence of the write operation information comprised in the write operation packet.

8. A method, comprising:

generating, by a second network device, write operation information according to a forwarding entry, wherein the write operation information comprises write operation data and a write operation address, wherein the write operation data indicates the forwarding entry, and wherein the write operation address indicates an address to which the write operation data is to be written;

encapsulating the generated write operation information into a write operation packet; and sending the write operation packet to a first network device, wherein the write operation packet indicates to write the write operation data into a memory according to the write operation address in the write operation information such that the writing updates a to-be-updated forwarding entry of a table of the first network device according to the forwarding entry indicated by the write operation data.

9. The method according to claim 8, further comprising:

sending a first control packet, wherein the first control packet comprises a count value, wherein the count value is a total count of write operation information in a write operation packet sent after a second control packet is sent, and wherein the second control packet is a control packet sent before the first control packet; and re-sending, in response to receiving first prompt information that indicates that a write operation packet sent after the second control packet is lost, the write operation packet sent after the second control packet, wherein the first prompt information is sent in response to a packet receive end detecting that a total quantity of memory write operations performed after the second control packet is received not being equal to the count value.

10. The method according to claim 9, wherein each of the first control packet and second control packet further comprises a sequence number, and wherein sequence numbers of control packets sent by a packet transmit end increase in ascending order; and wherein the method further comprises re-sending a write operation packet sent after a third control packet in response to receiving second prompt information that indicates that a control packet sent after the third control packet is lost, wherein the second prompt information is sent in response to the packet receive end detecting that a difference between a sequence number of the first control packet and a sequence number of the third control packet not being a preset difference, and wherein the third control packet is a control packet received by the packet receive end before the first control packet.

11. The method according to claim 9, further comprising performing, each time after a control packet is sent:

detecting whether an idle duration during which no write operation packet is sent after the control packet is sent is greater than a duration threshold;

sending a keepalive packet in response to the idle duration being greater than the duration threshold, wherein the keepalive packet comprises a sequence number, and wherein a difference between the sequence number of the keepalive packet and a sequence number of a previous control packet is a preset difference; and re-sending, in response to receiving third prompt information that indicates that a control packet sent after a fourth control packet being lost, a write operation packet sent after the fourth control packet, wherein the third prompt information is sent in response to the packet receive end detecting that a difference between the sequence number of the keepalive packet and a sequence number of the fourth control packet not being the preset difference, and wherein the fourth control packet is a control packet received by the packet receive end before the keepalive packet.

12. A forwarding entry update apparatus, comprising:
a memory;
a processor; and
a non-transitory computer-readable storage medium storing a software application and a program to be executed by the processor, the program including instructions to:
receive a write operation packet, wherein the write operation packet comprises write operation information, wherein the write operation information comprises write operation data and a write operation address, wherein the write operation data indicates a to-be-updated forwarding entry, and wherein the write operation address indicates an address to which the write operation data is to be written in the memory;
obtain the write operation information from the write operation packet; and write the write operation data into the memory according to the write operation address in the write operation information, wherein writing the write operation updates a to-be-updated forwarding entry of a table of the forwarding entry update apparatus according to the forwarding entry indicated by the write operation data.

13. The apparatus according to claim 12, wherein the program further includes instructions to:

receive a first control packet after writing the write operation data into the memory, wherein the first control packet comprises a count value, wherein the count value is a total count of write operation information in a write operation packet sent between a second control packet and the first control packet, and wherein the second control packet is a control packet sent before the first control packet;

detect whether a total quantity of memory write operations performed after the second control packet is received is equal to the count value, wherein the memory write operation is an operation of writing the write operation data into the memory;

send first prompt information in response to the count value not being equal to the total quantity, wherein the first prompt information indicates that a write operation packet sent after the second control packet is lost; and receive the write operation packet re-sent according to the first prompt information.

14. The apparatus according to claim 13, wherein each of the first control packet and the second control packet further comprises a sequence number, and wherein sequence numbers of control packets sent by a packet transmit end increase in ascending order;

wherein program further includes instructions to:
detect, after receiving the first control packet, whether a difference between the sequence number of the first control packet and a sequence number of a third control packet is a preset difference, wherein the third control packet is a control packet received before the first control packet;

determine, in response to the difference between the sequence number of the first control packet and the sequence number of the third control packet being the preset difference, the third control packet as the second control packet; and detect whether a total quantity of memory write operations performed after the third control packet is received is equal to the count value.

15. The apparatus according to claim 13, wherein the write operation packet further comprises a sequence number, and wherein a sequence number of a write operation packet sent, by the packet transmit end, between two control packets is equal to a sequence number of a control packet sent later;

wherein the program further includes instructions to:
collect, writing the write operation data into the memory, statistics on a total quantity of memory write operations performed according to write operation packets of a same sequence number;

obtain a correspondence between the sequence number and the total quantity;

obtain a total quantity corresponding to a sequence number of the first control packet; and detect whether the total quantity corresponding to the sequence number of the first control packet is equal to the count value.

16. The apparatus according to claim 14, wherein the program further includes instructions to:
- send second prompt information in response to the difference between the sequence number of the first control packet and the sequence number of the third control packet not being the preset difference, wherein the second prompt information indicates that a control packet sent after the third control packet is lost; and
- receive a write operation packet re-sent according to the second prompt information.

17. The apparatus according to claim 14, wherein the program further includes instructions to:
- receive a keepalive packet sent by the packet transmit end, wherein the keepalive packet comprises a sequence number, and wherein a difference between the sequence number of the keepalive packet and a sequence number of a previous control packet sent before the keepalive packet is the preset difference;
- detect whether a difference between the sequence number of the keepalive packet and a sequence number of a fourth control packet is the preset difference, wherein the fourth control packet is a control packet received before the keepalive packet;
- send third prompt information in response to the difference between the sequence number of the keepalive packet and the sequence number of the fourth control packet not being the preset difference, wherein the third prompt information indicates that a control packet sent after the fourth control packet is lost; and
- receive a write operation packet re-sent according to the third prompt information.

18. The apparatus according to claim 12, wherein the program further includes instructions to write the write operation data into the memory in sequence according to the write operation address in each piece of write operation information and according to a receiving sequence of the write operation packet and a sequence of the write operation information in the write operation packet.

\* \* \* \* \*